(12) United States Patent
Koneru et al.

(10) Patent No.: US 11,461,417 B2
(45) Date of Patent: Oct. 4, 2022

(54) METHODS FOR MANAGING AUTOMATED DISCOVERY AND KNOWLEDGE SHARING IN ONE OR MORE NETWORKS AND DEVICES THEREOF

(71) Applicant: Kore.ai, Inc., Orlando, FL (US)

(72) Inventors: Rajkumar Koneru, Windermere, FL (US); Prasanna Kumar Arikala Gunalan, Hyderabad (IN)

(73) Assignee: KORE.AI, INC., Orlando, FL (US)

( * ) Notice: Subject to any disclaimer, the term of this patent is extended or adjusted under 35 U.S.C. 154(b) by 336 days.

(21) Appl. No.: 16/810,522

(22) Filed: Mar. 5, 2020

(65) Prior Publication Data

US 2021/0279295 A1    Sep. 9, 2021

(51) Int. Cl.
*G06F 16/9535* (2019.01)
*G06N 3/00* (2006.01)
*G06F 21/62* (2013.01)
*G06F 16/2457* (2019.01)
*G06F 16/958* (2019.01)

(52) U.S. Cl.
CPC .... *G06F 16/9535* (2019.01); *G06F 16/24578* (2019.01); *G06F 16/972* (2019.01); *G06F 21/6218* (2013.01); *G06N 3/006* (2013.01)

(58) Field of Classification Search
CPC ............. G06F 16/2478; G06F 16/9535; G06F 16/972; G06F 21/6218; G06F 21/6245; G06N 3/006; G06N 20/00; G06N 5/04
See application file for complete search history.

(56) References Cited

U.S. PATENT DOCUMENTS 9,507,853 B1 *  11/2016  Popovici .............. G06F 16/3325
10,127,227 B1    11/2018  Badr et al.
(Continued)

FOREIGN PATENT DOCUMENTS

WO    2018085120 A1    5/2018
WO    2019203156 A1    10/2019

OTHER PUBLICATIONS

Microsoft.com. 2012. Multimedia Search Reranking: A Literature Survey, [online] Available at: <https://www.microsoft.com/en-us/research/wp-content/uploads/2016/02/acmcs12.reranking.survey.final_.pdf> [Accessed Mar. 26, 2021].
(Continued)

*Primary Examiner* — Etienne P Leroux
(74) *Attorney, Agent, or Firm* — Troutman Pepper Hamilton Sanders LLP (Rochester)

(57) ABSTRACT

A virtual assistant server receives a user input from a virtual assistant interface available on a client system associated with a user identified by a user identifier. Upon receiving the user input, the virtual assistant server creates a search network of repositories not associated with the user identifier by determining, for the received user input, a priority score of each repository not associated with the user identifier based on interactions of the user identifier through the virtual assistant interface. Further, the virtual assistant server searches, for the received user input, in a repository associated with the user identifier and in the repositories in the search network. Based on the searching, a group of one or more results corresponding to the received user input are identified and returned to the client system associated with the user identifier.

21 Claims, 12 Drawing Sheets

(56) References Cited

U.S. PATENT DOCUMENTS

| | | |
|---|---|---|
| 2005/0065980 A1 | 3/2005 | Hyatt et al. |
| 2007/0100978 A1* | 5/2007 | Levi .................. H04L 51/38 709/223 |
| 2007/0203693 A1 | 8/2007 | Estes |
| 2008/0243795 A1* | 10/2008 | Prahlad ............. G06F 21/6218 707/999.009 |
| 2012/0150888 A1 | 6/2012 | Hyatt et al. |
| 2012/0222132 A1 | 8/2012 | Burger et al. |
| 2015/0278024 A1* | 10/2015 | Barman ............ G06F 16/24578 707/634 |
| 2016/0034588 A1 | 2/2016 | Hyatt et al. |
| 2018/0032576 A1 | 2/2018 | Romero |
| 2018/0173714 A1 | 6/2018 | Moussa et al. |
| 2018/0218042 A1 | 8/2018 | Krishnan et al. |
| 2018/0232376 A1 | 8/2018 | Zhu et al. |
| 2018/0341533 A1* | 11/2018 | Shanbhag ............. G06F 9/4843 |
| 2018/0366125 A1* | 12/2018 | Liu .......................... G10L 17/04 |
| 2019/0042988 A1 | 2/2019 | Brown et al. |
| 2019/0179851 A1* | 6/2019 | Neumeier .......... H04N 21/4532 |
| 2019/0251201 A1 | 8/2019 | Chigusa et al. |
| 2019/0362438 A1* | 11/2019 | MacLaughlin ........ G06Q 10/10 |
| 2020/0050695 A1* | 2/2020 | Benjamin ........... G06F 16/9535 |
| 2020/0112838 A1* | 4/2020 | Fox ......................... H04W 4/21 |
| 2020/0159792 A1* | 5/2020 | Ravindran ............ G06F 16/958 |
| 2020/0265084 A1* | 8/2020 | Lee ..................... H04N 21/4661 |
| 2021/0165834 A1* | 6/2021 | Hasegawa .............. G06F 3/0611 |

OTHER PUBLICATIONS https://www.cognizant.com/. 2017. The Expanding Role of Chatbots in Enterprise Collaboration, [online] Available at <https://www.cognizant.com/whitepapers/the-expanding-roie-of-chatbots-in-enterprise-collaboration-codex2575.pdf> [Accessed Mar. 26, 2021].

Yan, R., 2018. "Chitty-Chitty-Chat Bot": Deep Learning for Conversational AI. [online] Ijcai.org. Available at: <https://www.ijcai.org/proceedings/2018/0778.pdf> [Accessed Mar. 26, 2021].

McGrath, C., 2018. When a chatbot is better than an intranet-and when it's not. [online] https://chatbotsmagazine.com/. Available at: <https://chatbotsmagazine.com/when-a-chatbot-is-better-than-an-intranet-and-when-its-not-2d5a7aff2423> [Accessed Mar. 26, 2021].

Capacity, 2018. Say Hello to Jane.ai. [video] Available at: <https://www.youtube.com/watch?v=9jyh3jGbJdw> [Accessed Mar. 26, 2021].

Frommert C., Häfner A., Friedrich J., Zinke C. (2018) Using Chatbots to Assist Communication in Collaborative Networks. In: Camarinha-Matos L., Afsarmanesh H., Rezgui Y. (eds) Collaborative Networks of Cognitive Systems. PRO-VE 2018. IFIP Advances in Information and Communication Technology, vol. 534, Springer, Cham. <https://doi.org/10.1007/978-3-319-99127-6_2> [Accessed Mar. 26, 2021].

* cited by examiner

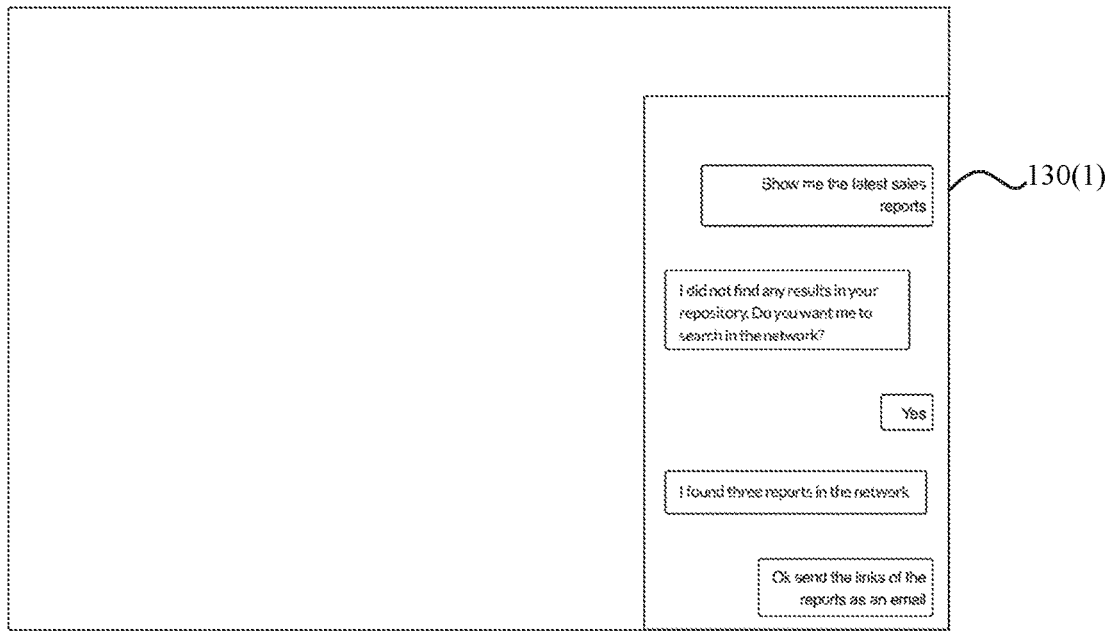
FIG. 7A
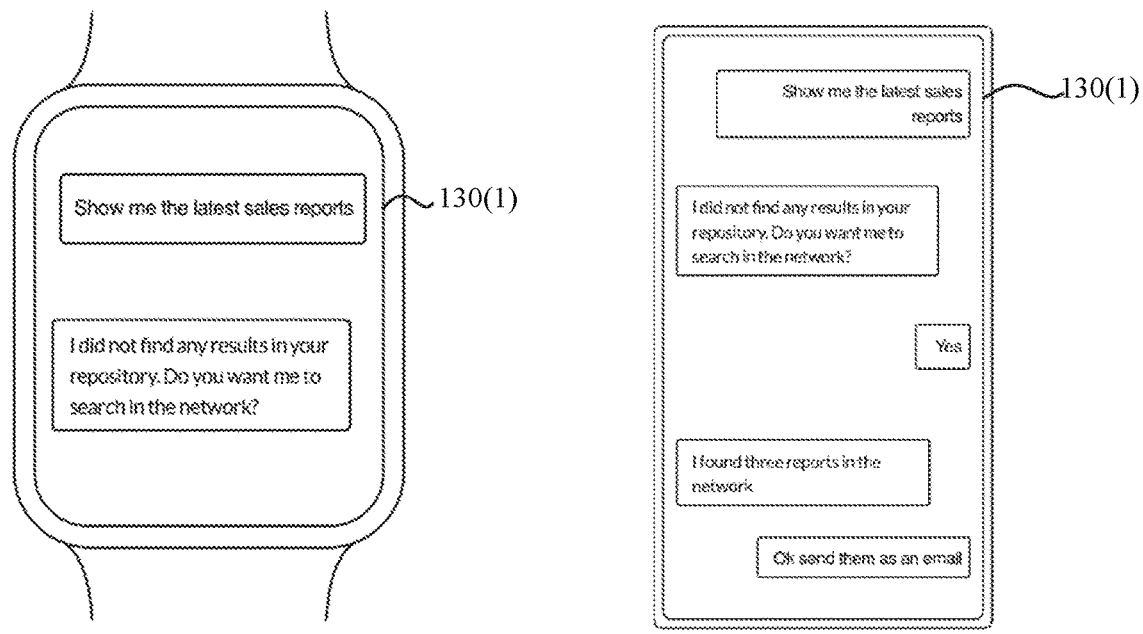
FIG. 7B
FIG. 7C

METHODS FOR MANAGING AUTOMATED DISCOVERY AND KNOWLEDGE SHARING IN ONE OR MORE NETWORKS AND DEVICES THEREOF

FIELD

This technology generally relates to methods and devices for managing automated discovery and knowledge sharing in one or more networks.

BACKGROUND

Effective and efficient access to vast amounts of information or other content in cloud-based networks or other networks with one or more groups of devices, such as within an enterprise, is highly desirable. Unfortunately, a lot of this information exists in silos in devices and other systems within these networks making discovery and sharing of this information difficult. Additionally, prior network search systems have had limited capabilities to identify and access this information. As a result, there continues to exist significant technological challenges in identifying and accessing this existing information from within the enterprise network. Further compounding this issue is that devices in an enterprise within these networks are often divided by physical and hierarchical boundaries that can complicate identification and access of this existing information.

For example, personal storage spaces, like hard disks or emails, stored on devices and systems within these networks may include information with different types and levels of sensitivity. Accordingly, there may be stored information appropriate for its owner to share with a set of users and inappropriate to share it with another set of users. In order to protect information, comply with confidentiality, or to prevent misuse, prior technologies often have restricted access to a smaller group of users than desired or could be permitted. Also, the manners in which this information can be requested have been limited to a request in an email, a request in a chat interface or a personal request which are not efficient and are time consuming.

In another example, to identify and access information that exists in a network, prior technological solutions have relied upon a brute force approach with a search system that receives a user inquiry for particular information and searches through all the indexed files in all the devices in the network. Unfortunately, such searches not only utilize a large number of processor cycles, memory, power and network bandwidth to retrieve the results, but also have relevancy issues.

This issue of identifying and accessing information is not limited to enterprises and extends to other types of networks. In online information retrieval systems, the user plays a major role in preparing the search queries, browsing through the results and identifying the most appropriate result for the search query. Additionally, when the results are not appropriate the user modifies the query and repeats the process. This search process is time consuming and lacks intelligence. Social networking tools have added some intelligence to the search, introduced user-centric searches and improved the forms and the extent of communication within a community, but like networks within enterprises their ability to improve knowledge discovery and sharing of information is limited. To address these issues, virtual assistants are integrated with the search systems to add a layer of personalization and intelligence to searching. This has improved the adoption of searching using voice and natural language. In particular, virtual assistants receive verbal or textual user input and then use natural language processing to identify user intent from the received user input and output results of relevant information from different available resources based on the identified user intent and received user input. Again, like in enterprise networks, the technological capabilities of these virtual assistants to effectively identify and access information has similarly been limited.

SUMMARY

An example of a method for automated discovery and sharing of knowledge includes searching, by a computing device, a repository associated with a user identifier to identify at least one first result that corresponds to a received user input from a virtual assistant interface on a client system associated with the user identifier. A search network comprising at least a portion of a group of repositories unassociated with the user identifier based on a priority score determined for each of the repositories in the group from interactions associated with the user identifier through the virtual assistant interface is created. One or more additional results that correspond to the received user input are identified from the search network. At least one non-eliminated result from the identified one or more additional results is identified based on comparing a scoring parameter associated with each of the identified one or more additional results with a threshold. At least one first result and the at least one non-eliminated result are ranked based on comparing the scoring parameter associated with the at least one first result and the at least one non-eliminated result. The at least one first result and the at least one non-eliminated result are output based on the ranking.

In an example, the present disclosure relates to a system for automated discovery and sharing of knowledge comprising, a processor and a memory. The processor is configured to search a repository associated with a user identifier to identify at least one first result that corresponds to a received user input from a virtual assistant interface on a client system associated with the user identifier. A search network is created comprising at least a portion of a group of repositories unassociated with the user identifier based on a priority score determined for each of the repositories in the group from interactions associated with the user identifier through the virtual assistant interface. One or more additional results that correspond to the received user input are identified from the search network. At least one non-eliminated result from the identified one or more additional results is identified based on comparing a scoring parameter associated with each of the identified one or more additional results with a threshold. The at least one first result and the at least one non-eliminated result are ranked based on comparing the scoring parameter associated with the at least one first result and the at least one non-eliminated result. The at least one first result and the at least one non-eliminated result are output based on the ranking.

In an example, the present disclosure relates to a non-transitory computer readable storage medium storing a program executable by at least one processing unit of a device and comprising programmed instructions to search a repository associated with a user identifier to identify at least one first result that corresponds to a received user input from a virtual assistant interface on a client system associated with the user identifier. A search network comprising at least a portion of a group of repositories unassociated with the user identifier is created based on a priority score determined for each of the repositories in the group from interactions associated with the user identifier through the virtual assistant interface. One or more additional results that correspond to the received user input are identified from the search network. At least one non-eliminated result is identified from the identified one or more additional results based on comparing a scoring parameter associated with each of the identified one or more additional results with a threshold. The at least one first result and the at least one non-eliminated result are ranked based on comparing the scoring parameter associated with the at least one first result and the at least one non-eliminated result. The at least one first result and the at least one non-eliminated result are output based on the ranking.

BRIEF DESCRIPTION OF THE DRAWINGS

FIG. 7A is a wireframe of an example of an interaction in a web browser on a display of a computer with the virtual assistant server.

FIG. 7B is a wireframe of an example of an interaction on a display of a wearable device with the virtual assistant server.

FIG. 7C is a wireframe of an example of an interaction on a display of a mobile device with the virtual assistant server.

DETAILED DESCRIPTION

Figure 1:
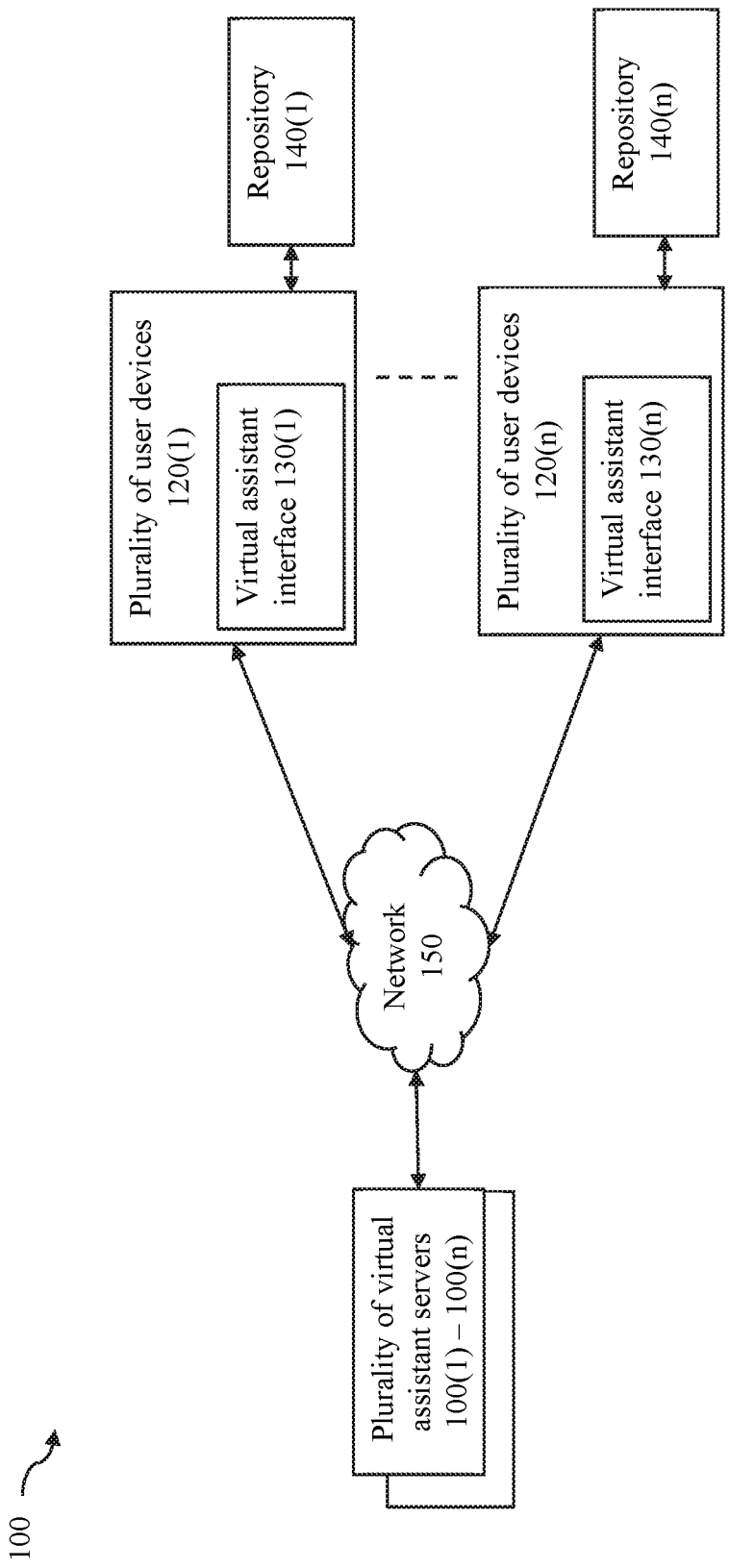
FIG. 1 is a block diagram of an example of an automated discovery and knowledge sharing system with a plurality of virtual assistant servers and user devices.

An example of an automated discovery and knowledge sharing system 100 is illustrated in FIG. 1. In this example, the automated discovery and knowledge sharing system 100 includes a plurality of virtual assistant servers (VA servers) 100(1)-100($n$) and a plurality of user devices 120(1)-120($n$) which are coupled together by a network 150. The plurality of user devices 120(1)-120($n$) may include a plurality of virtual assistant interfaces 130(1)-130($n$) and a plurality of repositories 140(1)-140($n$). The network 150 may be a Local Area Network (LAN), a Wide Area Network (WAN), although the system 100 can include other types and numbers of devices, components, elements and communication networks in other topologies and deployments. Additionally, the plurality of virtual assistant servers (VA servers) 100(1)-100($n$), the plurality of user devices 120(1)-120($n$) and the plurality of repositories 140(1)-140($n$) can communicate with each other using wireless technologies such as Wi-Fi, 3G, 4G, or 5G. While not shown, the exemplary system 100 may include additional components, such as routers, switches and other devices which are well known to those of ordinary skill in the art and thus will not be described here. This technology provides a number of advantages including providing methods, non-transitory computer readable media, and devices that more effectively and efficiently manage automated discovery and knowledge sharing within one or more networks.

Referring more specifically to FIG. 1, the plurality of VA servers 100(1)-100($n$) interact with the plurality of user devices 120(1)-120($n$). The plurality of VA servers 100(1)-100($n$) may include a back-end server, a computer or a plurality of computers executing a software application that enable communication with the plurality of user devices 120(1)-120($n$). Additionally, the plurality of VA servers 100(1)-100($n$) can be hosted on a cloud or could be provided as a service. The plurality of the VA servers 100(1)-100($n$) may be part of the same or different enterprise networks and may communicate with each other after handshaking. They may also communicate with each other based on predefined protocols. The VA server 100(1) may search in one or more of the plurality of repositories 140(1)-140($n$) to retrieve relevant results.

The plurality of user devices 120(1)-120($n$) receive an input and transmit the received input to the plurality of VA servers 100(1)-100($n$). The plurality of user devices 120(1)-120($n$) may have wired or wireless connectivity capabilities. For example, one or more of the user devices 120(1)-120($n$) may be a laptop, a desktop computer, a smartphone, a feature phone, a smartwatch, a telephony or voice enabled device or a wearable device or other such device capable of communicating with the VA server 100(1). Each of the user devices 120(1)-120($n$) may include a processor, a memory, and a communication interface, which are coupled together by a bus or other link, although one or more may have other types and/or numbers of components and other types of devices and/or nodes as well as other network elements could be used. In this example, the user device 120(1) may also include a virtual assistant interface (VA interface) 130(1) and a repository 140(1). The user of the user device 120(1) can use a VA interface 130(1) to communicate with the VA server 100(1). Similarly, in this example the other user devices 120(2)-120($n$) are the same in structure and operation as user device 120(1), although in other examples one or more user devices 120(2)-120($n$) may be different in one or more aspect. Accordingly, in this example the user device 120($n$) also may include a VA interface 130($n$) and a repository 140($n$). A pre-programmed device, an intelligent device, a software program or an intelligent software program may also interact with one or more of the plurality of VA servers 100(1)-100($n$). Other examples of other user devices or applications that may communicate with the one or more of the plurality of VA servers 100(1)-100(n) are a personal digital assistant (PDA), an internet-of-things device, or a web service.

The user operating the user device 120(1) may communicate with the VA server 100(1) using the virtual assistant interface 130(1). The virtual assistant interface 130(1) may include a web browser, a voice recognition interface, a mobile application, a gesture recognition interface or merely a telephony device enabling communication with one or more of the plurality of VA servers 100(1) using interactions such as, for example, a phone call or a short messaging service (SMS), etc. In this example, the other user devices 120(2)-120(n) may communicate and may include the same communication enabling systems, although in other examples one or more may be different.

The plurality of repositories 140(1)-140(n) may comprise a physical storage or a logical storage or a combination of the physical storage and the logical storage. For example, the repository 140(1) may be an email repository, a code repository, a project repository, a set of tasks, a set of documents, set of meeting invites, a hard disk, a solid-state drive, a USB drive or a flash drive, an optical drive, a network attached storage, a cloud storage or a combination of the above. For example, lab reports stored in the laptop, cloud storage and email associated with the user may form a logical lab report repository. In one example, the repository 140(1) may be associated with one or more of the plurality of user devices 120(1)-120(n).

The user device 120(1) and the repository 140(1) may be physically coupled to each other, communicatively coupled to each other via a communication connection, such as Bluetooth, NFC, BTLE, or the like, or via a wired or wireless network, such as a local Wi-Fi network, cellular network or a peer-to-peer network. Accordingly, in this example the plurality of user devices 120(2)-120(n) may similarly have one or more of the repositories 140(1)-140(n) associated with them and may be connected or other coupled in a local area network (LAN), wide area network (WAN) including the internet, but may also include other networks. Other such configurations may be used by one of the repositories of 140(1)-140(n) and the one of the user devices 120(1)-120(n) to communicate with each other. Also, each of the plurality repositories of 140(1)-140(n) may be accessed by one or more of the plurality of user devices 120(1)-120(n) and/or permissively accessed by one or more of the plurality of VA servers 100(1)-100(n) in some examples. One or more of the plurality of repositories 140(1)-140(n) may be: communicatively coupled with one or more of the plurality of user devices 120(1)-120(n), coupled with one or more of the plurality of user devices 120(1)-120(n), or may be a decouplable storage associated with one or more of the plurality of user devices 120(1)-120(n).

A user identifier may be associated with a user on one or more of the plurality of user devices 120(1)-120(n). The user identifier of the user operating the user device 120(1) may also be associated with one of the repositories, such as the repository 140(1) in this example. Also, multiple user identifiers may also be associated with one or more of the repositories 140(1)-140(n). By way of example, the user device 120(1) may communicate the user identifier to the VA server 100(1) along with the user input. The user identifier may also be communicated to the VA server 100(1) during a first communication session or during subsequent communication sessions between the user device 120(1) and the VA server 100(1), or during a first user session or subsequent user sessions between the software on the user device 120(1) and the VA server 100(1) by way of example. In one example, the first user session comprises the first time the user interacts with the software and provides an input which is communicated in this example to the VA server 100(1). The VA server 100(1) using the user identifier may uniquely identify the user or the user device 120(1) or both. The VA server 100(1) using the user identifier may also identify that the user is associated with a physical or a logical one of the repository 140(1) and/or the user device 120(1).

In this example, the VA interface 130(1) may interact with the VA server 100(1) using multiple channels. The user identified by the user identifier, operating the user device 120(1) may provide a user input through channels such as a web/mobile client, a voice or a telephony application, an email client, a mobile application, a messenger accessible from a social media web site etc. The channel may include the VA interface 130(1) enabling the user to provide the user input. The VA server 100(1) may be configured to receive the user input from the channel. Also, the VA server 100(1) may be configured to receive a first input from a first channel and a second input from a second channel, wherein upon receipt of the second input, the VA server 100(1) continues the conversation initiated in the first channel in the second channel. For example, the user using Skype® as the first channel in a laptop associated with the user identifier, provides the first input as: "suggest me good restaurants nearby." The user continues the conversation in Facebook as the second channel, providing a second input: "show me the ones that my friends dined." The VA server 100(1) may create the user identifier for each user and each time the user communicates with the VA server 100(1) from the first channel, the VA server 100(1) may associate a channel specific identifier, transmitted by the first channel to the VA server 100(1), with the user identifier. The VA server 100(1) may also receive the user identifier from the user device 120(1) and each time the user communicates with the VA server 100(1) from the first channel, the VA server 100(1) may associate a channel specific identifier, transmitted by the first channel to the VA server 100(1), with the user identifier. Based on the user identifier, the VA server 100(1) understands the identity of the user. The VA server 100(1) may require the user to log-in the first time the user tries to communicate with VA server 100(1) from the first channel. A log-in prompt may be presented to the user after the user tries to communicate with the VA server 100(1) from the first channel. The VA server 100(1) maintains context data related to the conversation. As the VA server 100(1) identifies that it is the same user, the VA server 100(1) understands the second input using the context data associated with the user identifier and provides a corresponding response to the user. The user may also continue the conversation in another user device, such as a desktop, a smart television, a mobile, a smartwatch, a voice assistant etc. In another example, the user input may also be provided by an application, a first virtual assistant or a program executable in the user device 120(1) and is not limited to the user manually providing the input.

The communication between the VA server 100(1) and the user device 120(1) through the channel may be synchronous or asynchronous. The user operating the user device 120(1), for example a feature phone or a smart phone, may use features such as calling, unstructured supplementary service data (USSD) or SMS to interact with the VA server 100(1). For example, the user may require the VA server 100(1) to perform a task when the user is unable to access mobile data services. Since mobile data is not available, the user sends an SMS to a designated number associated with the VA server 100(1). The VA server 100(1) receives the SMS, identifies the intent and completes the instructed task. An example conversation over SMS is mentioned below.

User: sms me the last r&d meeting notes

VA server: Sure, should I send it to the mobile number that you are using now.

User: Yes

VA server: Sent! Is there anything else that I can help you with?

User: No

The user operating the user device 120(1) provides the user input using the VA interface 130(1). The user input is transmitted to the VA server 100(1). The VA server 100(1) processes the user input and initiates a conversation with the user through the VA interface 130(1). The user device 120(1) and the user device 120(n) may also establish a peer-to-peer connection using the VA server 100(1) using any wired or wireless network protocol. The VA server 100(1) may also reside as a hardware or a software module in the plurality of user devices 120(1)-120(n).

The VA server 100(1) may receive an instruction from the user device 120(1) to perform a task. The VA server 100(1) may perform the task for multiple systems/users in a parallel manner. The task may include setting an alarm, adding a calendar event, sending: an email, a text message, audio message or video message, a notification, a URL, an access right, a document or a project task, to the user operating the user device 120(n). Performing the task may include interacting with software or modifying the software installed on the user device 120(1) or the user device 120(n). Although the examples above are described with reference to the user device 120(1), the VA server 100(1), and VA interface 130(1), one or more of the other user devices 120(2)-120(n) may operate in a similar manner with one or more of the other VA interfaces 130(2)-130(n) and one or more of the VA servers 100(2)-100(n).

Figure 2:
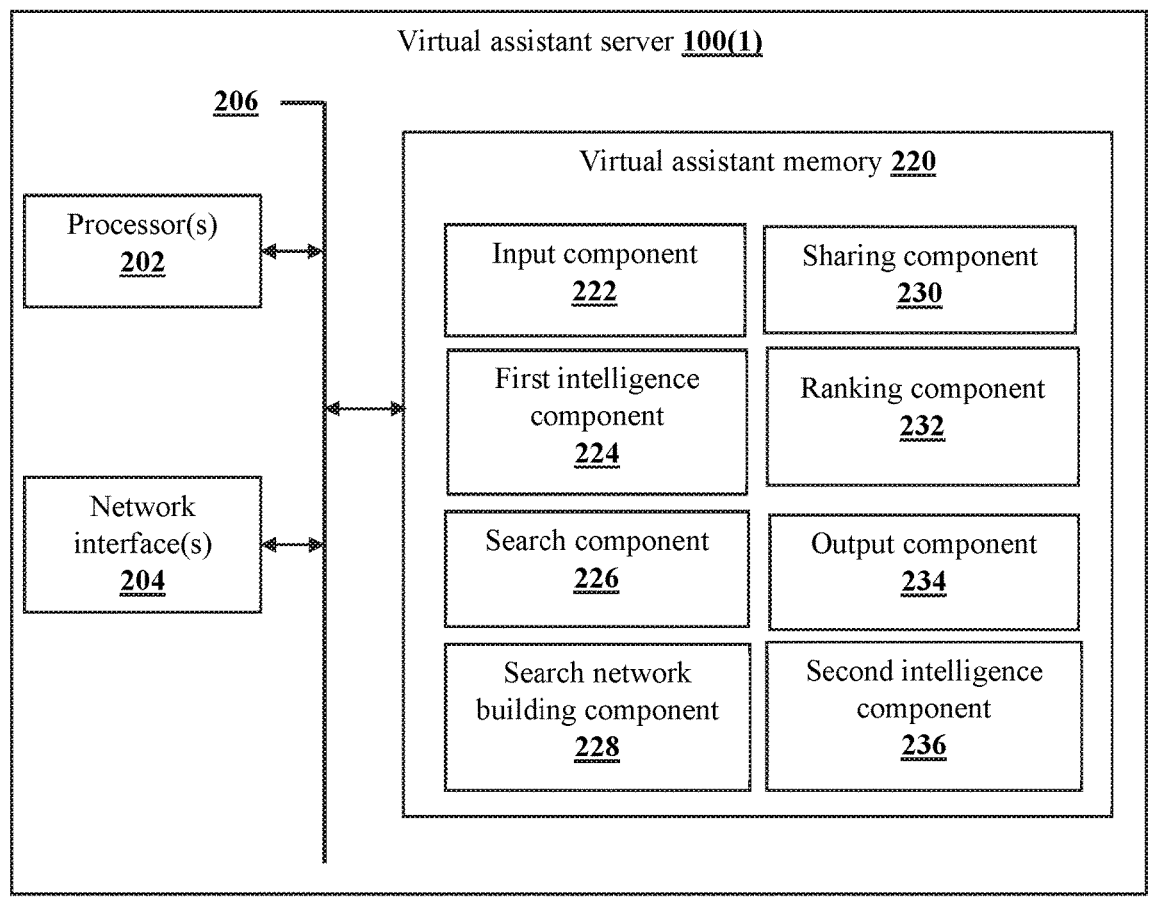
FIG. 2 is a block diagram of an example of components and the memory within one of the virtual assistant servers shown in FIG. 1.

An example of the virtual assistant server 100(1) is illustrated in FIG. 2. In this example, the VA server 100(1) may include a processor 202, a virtual assistant memory (VA memory) 220, a network interface 204 and an interconnect bus 206, although the VA server 100(1) may comprise other types and/or numbers of other systems, devices, components, and/or other elements in other configurations. In this example, the VA servers 100(1)-100(n) are the same in structure and operation, except as otherwise illustrated or described herein, although one or more of the VA servers 100(1)-100(n) may have other other types and/or numbers of other systems, devices, components, and/or other elements in other configurations in other examples.

The processor(s) 202 is coupled to the VA memory 220 and the network interface 204 via the interconnect bus 206 which enables communication between these and other components of the VA server 100(1). The processor 202 may fetch and execute one or more programmed instructions stored in the memory 220 for managing automated discovery and knowledge sharing as illustrated and described in the examples herein, although other types and numbers of functions and/or other operation can be performed. The processor 202 may include one or more central processing units and/or general purpose processors with one or more processing cores, for example.

The VA memory 220 is an example of a non-transitory computer readable storage medium capable of storing information and/or instructions. The VA memory 220 may be a random-access memory, a read only memory (ROM), an erasable programmable read-only memory (EPROM), an electrically erasable programmable read-only memory (EE-PROM), a portable optical disk including a CD, a DVD, a hard drive, a magnetic disk, a USB memory card, a memory stick or other electronic, magnetic, optical, electromagnetic, infrared or semiconductor based non-transitory computer-readable storage medium which may be used to tangibly store instructions, which when executed, perform one or more of the disclosed examples. The term computer-readable storage medium does not include signals and carrier waves. Examples of the programmed instructions and steps stored in the VA memory 220 are illustrated and described by way of the description and examples herein.

The network interface(s) 204 may provide or enable communication between the VA server 100(1) and other devices and/or systems, such as the plurality of user devices 120(1)-120(n) by way of example, via a network 150. By way of example only, the network interface(s) can use TCP/IP over Ethernet and industry-standard protocols, including NFS, CIFS, SOAP, XML, LDAP and SNMP although other types and numbers of communication protocols can be used. The network interface(s) 204 may also provide or enable communication with the VA server 100(1) across one or more networks such as a wired or a wireless network including the internet. The network traffic between VA server 100(1) and the network 150 may be monitored and regulated by a firewall.

As noted earlier, the VA servers 100(1)-100(n) are the same in structure and operation, although each could have other components or other modules. In this example, the VA memory 220 of the VA server 100(1) may include various hardware or software components or other modules, such as an input component 222, a first intelligence component 224, a search component 226, a search network building component 228, a sharing component 230, a ranking component 232, an output component 234, and a second intelligence component 236 described in examples below, although the VA memory 220 may have other types and/or numbers of other components and/or modules. The sharing component 230 and the ranking component 232 add additional functionality to the VA server 100(1) and are optional components. All the components of the VA memory 220 may communicate with each other and with the other components of the VA server 100(1).

The input component 222 receives an input from a channel, such as Skype® or Facebook® as described above communicatively coupled to the VA interface 130(1) for user device 120(1) in this example, the channel at least partially executable on the user device 120(1), although the input may be received from other sources. In some examples, the VA interface 130(1) is a user facing component of the channel. The input from the channel may be received in various formats like JSON, WL, VXML etc. Also, the input may be structured in different forms in each format. Depending on the channel, a channel adaptor (not shown) may extract the relevant content including a user input from the received input and transmit or forward the extracted content to the first intelligence component 224.

The first intelligence component 224 receives content from the input component 222 including the user input, processes the user input, identifies intent of the user input, a context of the user input and extracts an entity from the user input, although the first intelligence component may execute other types of operations on the input data in other examples. In this example, the first intelligence component 224 may only identify or extract one of, any two of, or all the three of intent, entity or context after receiving the content. When only one of the intent, entity or context is identified or extracted, a prompt may be sent to the user device to complete the user input or to provide the user input once again. It may be noted that, intent, context and entity are merely provided as examples and other types and/or numbers of parameters may be identified or extracted to provide a response to the received user input.

In one example, the first intelligence component 224 receives the user input: "show me the latest sales reports." The first intelligence component 224 identifies the intent as "show reports," the context as "latest," extracts the entity as "sales" and transmits them to the second intelligence component 236. The VA server 100(1) may interpret "latest" as all the sales reports created since the user identifier's previous request for "sales reports." The second intelligence component 236 may include a rule-based engine and/or at least one predictive model, although the second intelligence component 236 may include other types and/or numbers of other engines, models, or executable rules. In this example, the second intelligence component 236, based on the identified intent, context and the extracted entity, identifies components to build a search query, the components including but not limited to keywords, topic and relevant parameters. The second intelligence component 236 forwards the identified components to the search component 226.

The search component 226 creates a search query based on the identified components and searches a repository associated with the user identifier using the created search query and identifies one or more results, although other types of searching systems may be used. In this example, the second intelligence component 236, based on the identified intent, context and the extracted entity, also identifies one or more parameters from a set of parameters to create a search network. The second intelligence component 236 forwards the identified one or more parameters to a search network building component 228.

Based on the identified one or more parameters, the search network building component 228, identifies a group of repositories which may be included in the search network, although other manners for identifying repositories may be used. For example, if two parameters are identified, all the repositories in the network which have a weight value greater than zero for at least one of the identified one or more parameters are considered to be part of the group of repositories which may be included in the search network. For the identified group of repositories, the second intelligence component 236 retrieves weights associated with the identified one or more parameters and forwards them to the search network building component 228. In this example, the weights associated with the set of parameters are created and/or modified based on interactions of a user, identified by a user identifier, through the VA interface 130(1) for user device 120(1) in this example. The weights may also be created and/or modified based on other methods. The interactions associated with the user identifier may include, for example: scheduling meetings, sharing knowledge, assigning tasks, project tasks or queries including users on specific topics, executed through VA server 100(1).

Based on the identified one or more parameters and their weights for each repository in the identified group of repositories 140(2)-140(n) in this example, the search network building component 228 calculates a priority score for each repository in the identified group of repositories 140(2)-140(n), not associated with the user identifier in the network 150, although other manners for identifying the priority scores may be used. The repository 140(1) is associated with the user identifier in this example. The one or more repositories from the identified group of repositories 140(2)-140(n) to be included in the search network are identified based on the calculated priority scores. The search network building component 228 may forward the information about the repositories in the search network and their priority scores to the search component 226. The user identifier may interact with other user identifiers through the VA interface 130(1) of user device 120(1). For example, the user identifier may share an article with a second user identifier through the VA interface 130(1). The user interacting with the user device 120(1), identified by the user identifier, may schedule a meeting with a second user using another user device 120(2), identified by the second user identifier, through the VA interface 130(1). The user interacting with the user device 120(1), identified by the user identifier, may assign a task to the second user at user device 120(2), identified by the second user identifier, through the VA interface 130(1). The user interacting with the user device 120(1), identified by the user identifier, may send an email or have a chat with the second user interacting with a second user device 120(2), identified by the second user identifier, through the VA interface 130(1). For example, a user identifier A identifying user A, instructs the VA server 100(1) to send the recent meeting notes on patents. In this example, the relevant parameters for the user input may include <meeting date>, <meeting topic>, <meetings including <user A>>, <meeting notes> and <meeting participants>. Each parameter, in the set of parameters, may have a weight associated with the parameter for each of the other user identifiers in the network 150.

The second intelligence component 236, comprising the rule-based engine and/or the at least one predictive model, may adjust weights of the set of parameters, which are relevant to the user interactions, based on these user interactions, although other manners for adjusting the weights of the parameters may be used. In some examples, not all parameters in the set of parameters have a weight associated with each user identifier. The rule-based engine or the predictive model associates a parameter and a weight to the parameter with the user identifier based on the user interactions.

The search network building component 228 may use the weights, among other parameters, for example, to determine the repositories to search for the results, although other approaches for determining the repositories may be used. This allows user interaction-based repository identification. The set of parameters may be created and added to VA server 100(1) manually. The rules to modify weights of the set of parameters, for the user identifier, based on the user input or user interactions may be added to the rule-based engine of the VA server 100(1). Further, the weights of the set of parameters for the user identifier based on the user input and/or user interactions may also be created or modified by the predictive model.

The VA server 100(1) has the VA memory 220 associated with it. In this example, the VA memory 220 may include a user specific data store (not shown in the figure) and a virtual assistant specific data store (not shown in the figure) and an interactions store (not shown in the figure). The user specific data store includes, for example, data related to all the interactions associated with the user identifier, repositories associated with the user identifier, context of interactions associated with the user identifier and types of interactions associated with the user identifier. The data related to all the interactions associated with the user identifier include, for example, <topic>, <date>, <persons interacted with> and so on. The types of interactions associated with the user identifier include, for example, meeting, one-on-one interaction, tasks, chat, conference and so on. The one or more of the plurality of repositories 140(1)-140(n) associated with the user identifier may be identified automatically when the user connects (or logs-in) to the VA server 100(1). The user may also manually add information of the repository associated with the user identifier to the VA server 100(1). The VA specific data store stores, for example, the learning of the VA server 100(1), the set of parameters and the weights of set of parameters. The interactions store includes, for example, details related to all the interactions. The information included in the interactions store may be associated with a plurality of user identifiers. For example, it may include information that user identifier A, user identifier B and user identifier C had a chat interaction. As the information is not specific to a single user identifier, this may be used to query data, for example, by type of interaction. This may also be used for quicker retrieval of information on user interactions.

In this example, the second intelligence component 236, comprising the rule-based engine and/or the predictive model, which serves as a part of intelligence of the VA server 100(1), interacts with the VA memory 220. The predictive model improves itself after every interaction of the user identifier, based on training, implicit feedback, explicit feedback or other parameters. After learning from a certain number of interactions or training data or user feedback, the predictive model may improve its ability to suggest one or more parameters from the set of parameters which are used to identify the repositories to be included in the search network.

The VA server 100(1) parses the user interactions made through the VA interface 130(1) of user device 120(1) in this example and saves the information relevant to the set of parameters in the VA memory 220. Based on this information, the weights of the set of parameters are updated for each user identifier, although other manners for updating may be used. For example, the updating may also be based on explicit/implicit user feedback. In one example, the VA server 100(1) may also parse the user interactions made through other software applications in the user device and save the information relevant to the set of parameters in the VA memory 220.

Pre-Creation of Search Network

The search network building component 228 may also pre-create search networks for the user identifier and based on interactions of the user identifier through the VA interface 130(1) of the user device 120(1), update the search networks, although manners for creating search networks may be used. For example, the search network may also be created and/or updated based on user interactions through other applications. Each application through which the user interacts may also be given a weightage and the search network for the user input for the user identifier may be created based on the weightage.

Search in the Network

The search component 226 uses the search query created based on the identified components to search the repositories in the search network, although other approaches for searching may be used. The search component 226 searches the repositories in the search network using the search query and forwards the results identified from the repository associated with the user identifier and the repositories in the search network to the output component 234. The output component 234 transmits the identified results to the user device associated with the user identifier.

Output

In this example, the output component 234 transmits the identified results in a format identifiable by a corresponding channel which transmitted the user input. The identified results may also be transmitted to any other channel other than the channel which transmitted the user input.

In this example, the search network building component 228 may transmit information about one or more of the plurality repositories 140(2)-140(n) in the search network and their corresponding priority scores to the search component 226. The search component 226 identifies one or more results from the repository 140(1) associated with the user identifier and/or one or more of the plurality of repositories 140(2)-140(n) unassociated with the user identifier in the search network and transmits them to the second intelligence component 236 to calculate confidence scores. The second intelligence component 236 calculates the confidence scores of the identified one or more results from the repository 140(1) associated with the user identifier and/or the one or more of the plurality of repositories 140(2)-140(n) unassociated with the user identifier in the search network and transmits them to the search component 226. The search component 226 receives the calculated confidence scores and transmits the identified one or more results from the repository 140(1) associated with the user identifier and/or the one or more repositories 140(2)-140(n) unassociated with the user identifier in the search network and their corresponding confidence scores, their corresponding repository information and the priority scores of the repositories unassociated with the user identifier to the sharing component 230. The sharing component 230 receives the transmitted information. In one example, the priority score of the repositories associated with the user identifier may be given the highest priority score possible on an adopted scale or the highest priority score among the calculated priority scores.

The result may be a document, a part of a document, an e-mail, a part of an e-mail, a contact, a multimedia file, a HTML file, a credential, a software program, a part of a software program, an image, an editable interface or a workflow and so on. The result may be stored as a file in one or more of the plurality of repositories 140(2)-140(n) which may be a local storage, an internal network storage or a cloud storage. Each of the plurality of repositories 140(2)-140(n) and each file stored in one or more of the plurality of repositories 140(2)-140(n) may be associated with at least one user identifier. The at least one user identifier associated with the repository may grant access to the files or may provide a sharing permission of the files stored in the repository to devices associated with other user identifiers. The access or the sharing permission may be in the form of a view-only access, editable access, unlimited access, time bound access, access limited by number of views, number of edits or access to parts of the document or and so on. In one example, the sharing component 230 may intelligently determine that a second user identifier may need access to a first file associated with the first user identifier based on interactions of the first user identifier through the VA interface 130(1). Further, the sharing component 230 may also transmit a request to the first user identifier to proactively grant sharing permission to share the first file with the second user identifier. The sharing component 230 may also determine the type of sharing permission that may be provided to the second user identifier and transmit a sharing request to the device associated with the first user identifier. In one example, the sharing component 230 may intelligently identify: the users who may require sharing permissions to files associated with the first user identifier based on interactions of the first user, the type of sharing permissions that may be provided to them based on interactions of the first user, and transmit this data to the device associated with the first user identifier. The device associated with the first user identifier may receive this data and provide permissions which may be transmitted to the sharing component 230.

In this example the sharing component 230 verifies the sharing permissions of the one or more results identified from one or more of the plurality of repositories 140(2)-140(n) unassociated with the user identifier in the search network. Based on the verification, for those that do not have a sharing permission, the sharing component 230 sends sharing permission requests to devices associated with the user identifiers of those results. The sharing permission request may be sent in the form a voice output, an email, a message in a messenger, or through the virtual assistant interfaces. The devices associated with the user identifiers of those results, which receive the sharing permission request, may grant, reject, partially/conditionally grant sharing permissions in the form a voice output, a reply to the email, a reply message in the messenger, or through the plurality of VA interfaces 130(2)-130(n). The devices which receive the sharing permission request, may also instruct the VA server 100(1) to send a reminder and subsequently the sharing permission request may be saved as a task or a reminder. The sharing component 230 may collate the results for which sharing permissions already exist, results for which sharing permissions are received and the one or more results identified from the repository associated with the user identifier into shareable results and transmit them along with their corresponding confidence scores and the priority scores of their corresponding repositories to the ranking component 232.

In this example the ranking component 232 may rank the shareable results based on the determined priority scores of their corresponding repositories. The ranking may also be based on the determined priority scores of their corresponding repositories and/or the confidence score of each shareable result. The ranked results may be transmitted to an output component 234. The ranking component 232 may separately rank the results associated with the user identifier and the results from one or more of the plurality of repositories 140(2)-140(n) unassociated with the user identifier in the search network in the shareable results and transmit the ranked results to the output component 234.

In this example the output component 234 outputs the ranked results along with their ranks to the user device. The user device receives the outputted results. The user device also includes an application configured to display the received results in a graphical user interface (GUI) in an order based on their respective ranks.

The predictive model, which is part of the second intelligence component 236, executable by the VA server 100(1) may learn about the availability of content in the search network including a plurality of repositories after each search. The VA server 100(1) may also use this learning to predict the repositories to be included in the search network.

The repository associated with the user identifier and/or the repositories in the search network may be configured by an administration component (not shown) of the VA server 100(1). The data storage limits, access controls and other policies of the repositories may be set by configuring the administration component.

The repository associated with the user identifier and the repositories in the search network may be part of an enterprise network. In one example, the VA server 100(1) may act as an enterprise assistant to the users operating the devices which are part of the network. The repository associated with the user identifier and the repositories in the search network may be part of different enterprise networks communicatively coupled to each other. The VA server 100(1) may exist in the different enterprise networks and may be configured to communicate across networks to execute user instructions. The different enterprise networks may also include multiple servers like VA server 100(1) which may be configured to communicate across enterprise networks to execute user instructions.

The confidence score of each identified result may be used along with the priority score of its corresponding repository to calculate a relevance score. A weightage may be provided manually or automatically to the confidence score and the priority score to calculate a relevance score. Other such scores may be computed, manually or automatically, and combined with the priority score to calculate the relevance score. The relevance score may also be used to rank the shareable results.

In one example, the ranking component 232 receives one result from the repository associated with the user identifier B and one result from the repository associated with the user identifier C. The ranking component 232 prioritizes the results from the repository associated with user identifier C, if the confidence score of the result from the repository associated with user identifier C higher than the confidence score of the result from the repository associated with user identifier B.

Limiting Number of Results

In some examples, the number of results is limited before transmitting it to the user device. For example, the user device associated with the user identifier A receives a user input. The received user input is transmitted to the VA server 100(1). The search component 226 identifies one result from the repository associated with the user identifier A, ten results from the repository associated with user identifier B and six results from the repository associated with user identifier C. The computed priority scores of the repositories associated with user identifier A, user identifier B and user identifier C and/or the confidence scores of each identified result are used to limit the number of results based on a threshold. Six of the ten results identified from the repository associated with user identifier B and three of the six results identified from the repository associated with user identifier C may be eliminated and thereby seven results identified from the repositories associated with user identifier B and user identifier C are non-eliminated. The search component 226 transmits the non-eliminated results to the sharing component 230. The computed priority scores of the repositories and the confidence scores of the identified results are examples of a scoring parameter. The scoring parameter may be compared with the threshold to identify the non-eliminated results. It may be noted that scoring parameters may include other types of parameters associated with values that may be calculated and compared with a threshold.

The sharing component 230 verifies the sharing permissions of the seven non-eliminated results. In one example, after the verification, the sharing component 230 identifies that six of the seven identified results do not have the sharing permission granted to user identifier A and one of the seven identified results has the sharing permission granted to user identifier A. The sharing component 230 sends sharing permission requests to the devices associated with user identifier B and user identifier C to share six of the seven identified results which do not have sharing permissions. The sharing permission request may be sent to the devices associated with user identifier B and user identifier C in the form a voice output, an email, a message in a messenger, or through the virtual assistant interfaces associated with user identifier B and user identifier C and so on. User identifier B and user identifier C may grant or reject sharing permissions in the form a voice output, a reply to the email, a reply message in the messenger, or through the virtual assistant interfaces associated with user identifier B and user identifier C and so on. User identifier B and user identifier C may also instruct the VA server 100(1) to remind later and subsequently the sharing permission requests may be saved as a task or a reminder. In one example, the sharing component 230 receives sharing permissions for five results, to share those five results with the device(s) associated with user identifier A. The sharing component 230 collates the five results for which sharing permissions are received, one result for which the sharing permission already exists and one result from the repository associated with the user identifier into seven shareable results and transmits them to the ranking component 232. The devices associated with user identifier A may already have permission to view or edit files from a repository associated with the other user identifier(s) in the network. The sharing component 230 may predetermine the repositories for which the user A may request access to and request sharing permissions for those repositories proactively.

In this example the ranking component 232 ranks the shareable results based on the priority scores of the repositories associated with user identifier A, user identifier B and user identifier C or the confidence scores of each identified result or the relevance scores of each identified result. The ranked results are transmitted to the output component 234.

In this example the output component 234 outputs the ranked results along with their ranks to the system or user device associated with the user identifier A. The system or the user device associated with the user identifier A receives the outputted results and includes an application configured to display the outputted results in a graphical user interface (GUI) in an order based on their respective ranks. Based on the feedback of the user identifier A, the second intelligence component 236 may modify the weights of the one or more parameters associated with user identifier A.

Figure 3A:
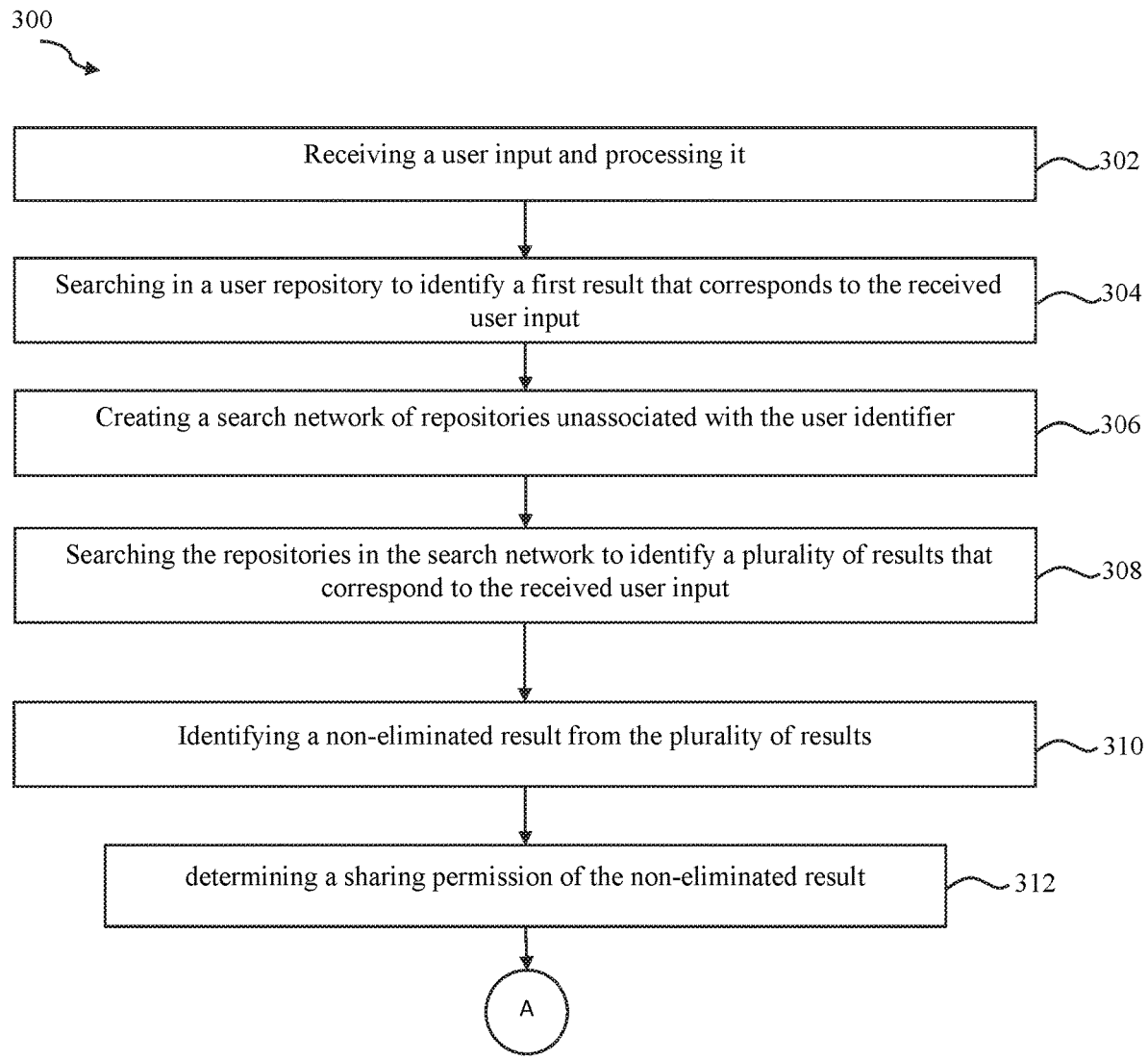
FIG. 3A is a first portion of a flowchart of an example of a method for receiving a user input and providing an output.

FIG. 3A is a first flowchart portion of an example of a method for receiving a user input and providing an output. In some examples, process 300 may be performed by a system similar or identical to system 100 having the VA server 100(1) configured to communicate with the user device 120(1) similar or identical to a computer, a mobile device, a telephony or voice enabled devices or a wearable device. The user device 120(1) is configured to execute the VA interface 130(1).

At step 302, a user input "Show me the latest lab reports," may be received by the VA server 100(1) from the user device. In some examples, a user may provide a text, audio (or voice) or gesture as an input which is processed by the user device using software, hardware or a combination of both and transmitted to the VA server 100(1). The VA server 100(1) receives the user input from a channel communicatively coupled to the VA interface 130(1) executable on the user device 120(1).

Example channels are Skype®, Facebook® messenger, Slack® etc. These channels may provide the VA interface 130(1) to the user, receive inputs and transmit them to the VA server 100(1). These channels may also support or embed the VA interface 130(1) in some examples. The VA server 100(1) processes the user input, identifies intent and a context of the user input and extracts an entity. The intent of the user may be defined as "what the user wants the chatbot to do" in some examples. The context helps the VA server 100(1) understand the user input and reduces the need for the user to provide additional information regarding the input. To fulfill the intent identified in the user input, the VA server 100(1) may require additional information or parameters. For example, to get a weather forecast, the VA server 100(1) needs the name or zip code of the location. An entity is a necessary field, data, or words for a chatbot or a virtual assistant to execute the user input. A software program may be used to identify intent, context and extract the entity. The software program may be executable in the VA server 100(1) or the program may be an external service accessible by the VA server 100(1). Example intent, entity and context are disclosed in the table below.

TABLE 1

| Sample user input | Intent | Entity | Context |
|---|---|---|---|
| 1.Book me a flight to Orlando for Sunday | Book flight | City: Orlando Travel date: Mar. 24, 2019 | |
| 1a. Also book a cab there on arrival | Book cab | | City: Orlando Date: Mar. 24, 2019 |
| 2. What are the causes of disease A | Disease causes | Disease A | |
| 2a. What are the symptoms of it in children | Disease symptoms | Patient type: child | Disease name: Disease A |
| 2b. where are the best hospitals for its treatment in Los Angeles | Find Hospital | City: Los Angeles | Disease name: Disease A Patient type: child |
| 3. Show me the latest lab reports | Show reports | Lab | Latest |

As shown in table 1, for the user input, "Book me a flight to Orlando for Sunday," the VA server 100(1) has programmable instructions and rules that identify the intent as "book flight," the entities are identified as "City: Orlando" and "Travel date: 03/24/2019." For the subsequent user input, "Also book a cab there on arrival," the intent is identified as "book cab," the context is identified as "City: Orlando," "Date: 03/24/2019" based on the previous conversation.

As shown in table 1, for the user input, "What are the causes of disease A," the intent is identified as "Disease causes," the entity is identified as "Disease A." For the subsequent user input, "What are the symptoms of it in children," the intent is identified as "Disease symptoms," the entity is identified as "Patient type: child" and the context is identified as "Disease name: Disease A" based on the previous conversation. For the subsequent user input, "where are the best hospitals for its treatment in Los Angeles" the intent is identified as "Find Hospital," the entity is identified as "City: Los Angeles" and the context is identified as "Disease name: Disease A" "Patient type: child" based on the previous conversation.

As shown in table 1, for the user input "show me the latest lab reports," the intent is identified as "show reports", context as "latest" and entity as "lab."

At step 304, the VA server 100(1) may create a search query from the identified intent, context and the extracted entity and search a repository associated with a user identifier to identify a first result corresponding to the search query.

The VA server 100(1) may transmit the identified first result to the user device for display. When a plurality of results are identified, a confidence score may be associated with the identified results and only the results with the highest confidence scores may be transmitted to the user device for display. An identified first result may be displayed under the heading: "result from your repository", or "result from your drive" and so on. If a result is not identified from the repository associated with the user identifier, a notification: "no results were found in your repository," may be transmitted to the user device. Along with the identified first result, a message: "would you like me to search the network for the latest lab reports," may be transmitted to the user device. Upon receiving a confirmation to this message from the user device, a search network for the input "show me the latest lab reports," for the user is created. The confirmation message may also be received by the VA server 100(1) from a software, an application or an intelligent software.

At step 306, the VA server 100(1) may use one or more of the intent, context and entity to create a search network of repositories not associated with the user identifier as described in the examples earlier. In this example, the intent, context and the entity are fed into a rule-based engine or a predictive model to identify one or more parameters, from a set of parameters, used to create the search network. The one or more parameters may be used to identify a group of repositories that may be included in the search network. The VA server 100(1) may also use the intent, context and the entity to identify the group of repositories that may be included in the search network.

Examples of the one or more parameters are:
a. meetings: <meeting topics>, <meeting times>, <meeting notes>, <meeting participants>
b. knowledge shared: <type of documents shared>, <title of the documents shared>, <content of the documents shared>
c. parameters determined based on the search query (based on whether it is a generic search query versus a specific search query)—for example: a search query may be a generic query about human resource (HR) function directed to a HR representative versus a search query by a HR representative about a specific HR function directed to another HR representative
d. hierarchy of users in an enterprise
e. <tasks shared> between the user identifiers, <interaction time between the user identifiers>, <percentage of total interactions> etc.

The VA server 100(1) may store the information related to the repositories associated with the user identifier. This information may be input by the user, administrator or learned by the VA server 100(1). For example, the VA server 100(1) has information stored in its memory that a user identifier A is associated with a laptop, a solid-state drive, a cloud repository, an email repository and a task repository. In some examples, the VA server 100(1) may parse, retrieve or receive information from user interactions, emails, calendars, other communication applications, project applications, HR applications, databases or any other forms of repositories. The VA server 100(1) may also query an application or retrieve information using APIs. The VA server 100(1) may use the parsed, retrieved or received information, for example, to modify weights of the one or more parameters. Employees or users in an enterprise may provide permission to the VA server 100(1) to access the repositories associated with their corresponding user identifiers. The permission may provide the VA server 100(1) with complete access, partial access, conditional access, request-based access, time-bound access, query-based access, topic-based access, query origin-based access, repository-based access etc. The permission may also provide the VA server 100(1) access to a combination of these. For example, a user identifier B is associated with an email repository, a task repository and a cloud repository. The user identifier B may provide complete access of the email repository to the VA server 100(1). In another example, the user identifier B may provide a request-based access to the task repository associated with it, when the request is from user identifier A. The users may grant access permissions to the VA server 100(1) through the VA interface 130(1). It may be understood that the system 100 may include multiple such combinations. The VA server 100(1) may have search access to all the repositories. However, the VA server 100(1) may require permission to share the search result with user identifier B, when the user identifier B is not associated with the repository from which the search result is identified. It may be understood that, association of the user identifier with a repository and ownership of the repository by the user associated with user identifier may have the same or similar meaning.

In this example, based on the user input, the VA server 100(1) identifies the one or more parameters as <frequency of interactions> and <topic>. Based on these two parameters, in this example repositories associated with user identifiers B, C, D, E, F, G, H, I, J are considered as a group of repositories which may be included in the search network.

In one example, user identifier A interacts frequently with user identifier B through the VA interface 130(1) including the entity "lab" and interacts less frequently with user identifier C including same entity and least frequently with user identifiers D, E, F, G, H, I and J including the same entity. For search inputs including the entity "lab" received from the user device associated with user identifier A, one or more parameters may be identified and priority score for each repository in the search network may be determined (here priority scores of repositories associated with user identifiers B>C>D>E>F>G>H>I>J) based on the parameter <frequency of interactions> of user identifier A including the <topic> "lab reports." The weights of the one or more parameters for the repositories associated with user identifiers B, C, D, E, F, G, H, I, J are considered to calculate the priority scores. Based on the determined priority scores, the VA server 100(1) may include the repositories associated with user identifiers B, C, D, E, F, G and H in the search network of user identifier A for the input "show me the latest lab reports."

At step 308, the search query created in step 304 is used to search the repositories, not associated with the user identifier, in the search network to identify results corresponding to the search query. For the user input, each repository in the search network may have a priority score associated with the user input and each result identified in step 308 and step 304 may have a confidence score associated with it.

The confidence score and/or the priority score may be used to eliminate some results from the results identified in the search network. All the results with the confidence score and/or priority score less than a threshold may not be output to the user device. Using the threshold, at step 310, a non-eliminated result may be found.

At step 312, the sharing permission of the non-eliminated result is determined by the VA server 100(1). For the user identifiers having the sharing permission, the sharing permission may denote time shared, date shared, number of views allowed, resharing permissions, portions of the non-eliminated result shared and so on.

Figure 3B:
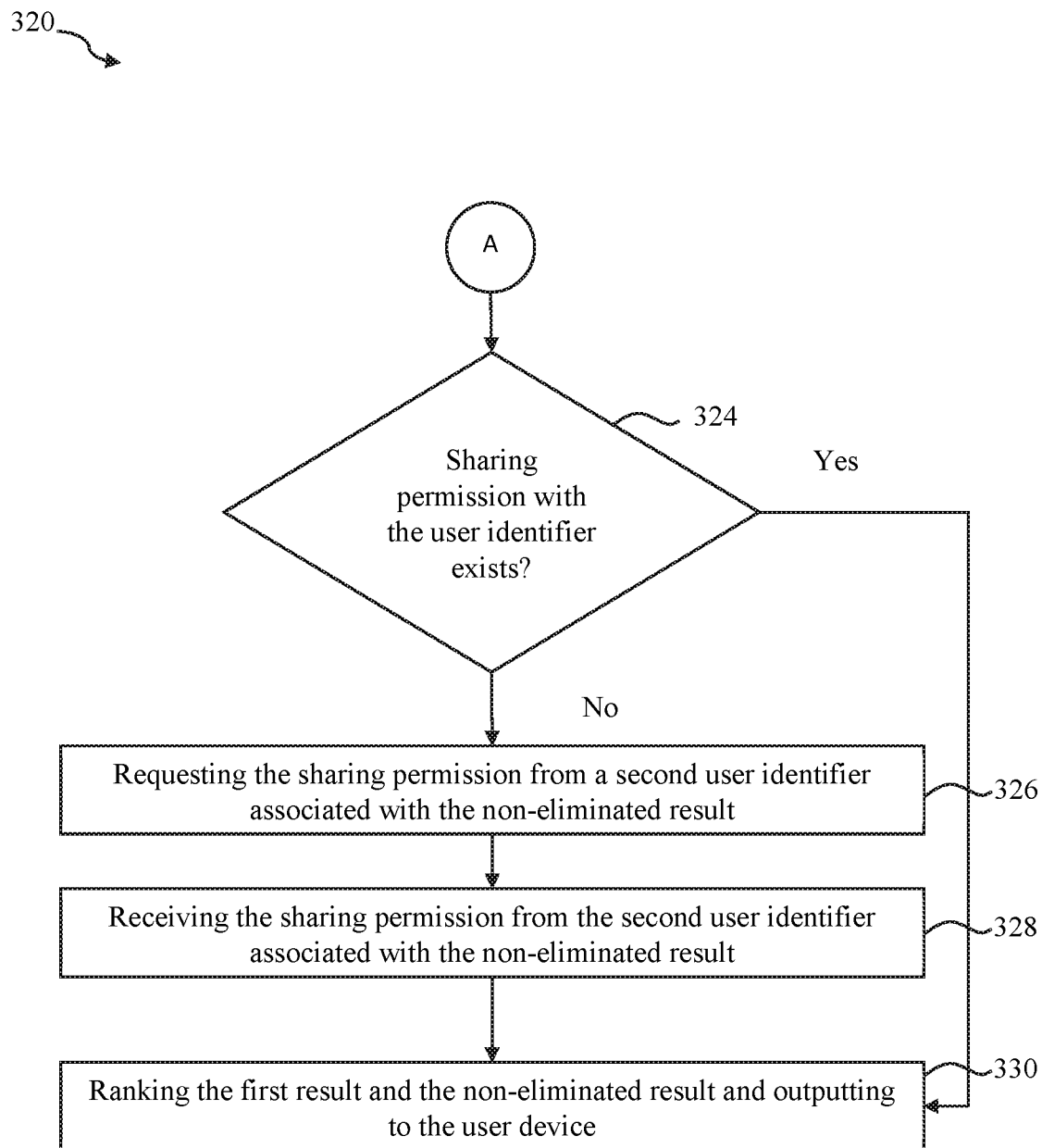
FIG. 3B is a second portion of a flowchart of the example of the method for receiving the user input and providing the output.

Referring to FIG. 3B, a second portion of the flowchart of the example of the method for receiving a user input and providing an output is illustrated. At step 324, upon determining that the sharing permission, to share the non-eliminated result with the user device exists, the non-eliminated result identified at step 310 in FIG. 3A and the first result identified at step 304 in FIG. 3A are ranked and at step 330 output to the user device. At step 324, upon determining that the sharing permission to share the non-eliminated result with the user device does not exist, the VA server 100(1), at step 326, requests permission from the user identifier corresponding to the non-eliminated result to share the non-eliminated result with the user device.

The user identifier may be an identifier of the user, a software, a hardware, or a software operating a hardware. The user identifier corresponding to the non-eliminated result may evaluate the sharing permission request and provide a response to the VA server 100(1) through the VA interface 130(1). When the user identifier corresponding to the non-eliminated result is the identifier of a software, hardware or software operating the hardware, the user identifier may provide rule-based permissions or create share permissions dynamically based on the request.

In this example, the user identifier corresponding to the non-eliminated result may:

grant the sharing permission;
deny the sharing permission; or
provide a conditional/partial sharing permission.

The user identifier corresponding to the non-eliminated result may instruct the VA server 100(1) to save the request as a task or a reminder and at a later point of time, grant or deny the sharing permission or provide a conditional/partial sharing permission.

At step 328, the VA server 100(1) receives the sharing permission from the user identifier corresponding to the non-eliminated result and at step 330, ranks the first result and the non-eliminated result, and outputs them along with ranks to the user device for display. The VA server 100(1) may not receive the sharing permission from the user identifier corresponding to the non-eliminated result. In this case, at step 330 only the first result is output to the user device for display. The VA server 100(1) may receive a conditional/partial sharing permission from the user identifier corresponding to the non-eliminated result. In this case, at step 330, the VA server 100(1) ranks the first result and the non-eliminated result and outputs them, based on the conditional/partial sharing permission, along with their ranks to the user device for display.

A copy of the non-eliminated result may be created by the VA server 100(1) after receiving the sharing permission from the user identifier corresponding to the non-eliminated result. The copy of the non-eliminated result may be stored in the VA memory 220 until a time frame. When the user identifier provides a same or a similar instruction to the VA server 100(1) before the time frame expires, the VA server 100(1) evaluates the relevance of the non-eliminated result to the same or similar instruction and outputs the non-eliminated result to the user device based on the evaluation.

The VA server 100(1) may also create access control applicable to the copy of the non-eliminated result. The access control may be created based on user preferences, server intelligence, prior interactions, intent, context or entity of the user input or relevant parameters. In this example, the access control enables the VA server 100(1) to identify the conditions under which the VA server 100(1) can share the non-eliminated result with the user identifier. At step 330, the first result and the non-eliminated result may be ranked by using the calculated confidence scores and/or the determined priority scores before outputting them to the user device.

Priority Scores

The priority scores may be determined based on one or more parameters. The priority scores may be determined only for the group of repositories that may be included in the search network or for all the repositories in the enterprise network. The priority scores, for example, may be determined based on one or more parameters such as <frequency of interactions> or <percentage of interactions>. The one or more parameters considered to determine the priority score may be determined by the predictive model, rule-based engine or by using other algorithms. The weights of the one or more parameters may be used to determine the priority score.

In one example, the VA server 100(1) receives the user input "show me the latest lab reports shared via email" from user identifier A. Based on the user input, <freshness of interactions>, <topic>, <email activity> are considered as the one or more parameters from the set of parameters. Based on the one or more parameters, the repositories associated with user identifiers B, C, D, E, F, G, H, I and J are considered to calculate the priority scores. It is also determined that user identifier A had an email interaction last week with user identifier B on lab reports and the user identifier A had a chat through the VA interface 130(1) with user identifiers C, D and E on research reports. Accordingly, repository associated with user identifier B gets a priority score P0, repositories associated with user identifiers C, D and E gets a priority score P1. The repositories associated with user identifiers F, G, H, I and J, who did not interact with user identifier A recently, get a priority score P2, P3, P4, P5 and P6 respectively, wherein the priority scores, P0>P1>P2>P3>P4>P5>P6. The weights of the one or more parameters are considered to calculate the priority scores. It may be noted that any other factor may be considered to calculate the priority scores.

The VA server 100(1) may also search through or communicate with the repositories or applications associated with user identifier A such as email, file storage, storage drive, cloud drive, a chat application, a file sharing system and so on, to create or modify weights associated with the one or more parameters and determine priority scores for each repository in the search network for the search topic.

Priority Based on Interactions of Other Users

The priority of the user device for the user input may also be determined based on interactions of other users, in the enterprise, through the VA interface 130(1). In one example, a user identifier K may be the most frequently contacted user for "lab reports." For a search "show me the latest lab reports," run by user identifier A, the VA server 100(1) may give higher priority to the repository associated with user identifier K to be included in the search network based on the one or more parameters, for example, <frequency of interactions> and <topic>.

Confidence Score

For the user input, "find me the latest meeting notes on patents," in this example the following are identified, intent: find meeting notes, context: latest, entity: meeting, topic: patents. In some examples, based on rules, for the user input, the one or more parameters <topic>, <title, content> are identified. The one or more parameters may also be identified by the predictive model. The predictive model is trained by providing the predictive model with a training set of user inputs, parameters to be identified and weights of the parameters. For an input provided after the training, the predictive model may identify components to build a search query. The components may include, but are not limited to, keywords, topic and relevant parameters. In some examples, topic and keywords may also be relevant parameters. The search query is formed, for example, as: against <identified repositories> search for documents relevant to <topic>: patents and <title, content>: meeting notes.

Results Identified:
1. Subject of email1: meeting notes on patents
2. Subject of email2: meeting notes
3. Subject of email3: patent meeting For the results, a boost in the confidence score is provided, for example, if the <topic> is identified in title or headers, or if the result is identified from a repository associated with a user identifier the user identifier A has interacted with recently, or if the result is identified from a repository associated with the user identifier whose associated user is in the contact list associated with user identifier A. Other such rules may be used by the rule-based engine or learned by a second predictive model to compute the confidence score of the results. Here, result 1 gets the highest score as the second predictive model for the user input considers, among other parameters, context, parts of speech, word match, tense. The confidence scores of result 1, result 2 and result 3 are calculated as C0, C1 and C2 respectively, where C0>C2>C1. A threshold T may be calculated, for example, as a percentage of the highest confidence score, as an average, or median of the calculated confidence scores. Here C0>T>C2>C1. Hence results associated with C1 and C2 are eliminated. It may be understood that the threshold may be calculated by any suitable predictive model, intelligent algorithm, mathematical algorithm or formula. The predictive model and the second predictive model may be same, similar or different models.

In some examples, after execution of the step described in step 308, all the shareable results may be shared with the user device which transmitted the user input to the VA server 100(1) at step 302. The steps described in steps 310-330 in FIG. 3A and FIG. 3B may not be executed by the VA server 100(1).

Figure 4A:
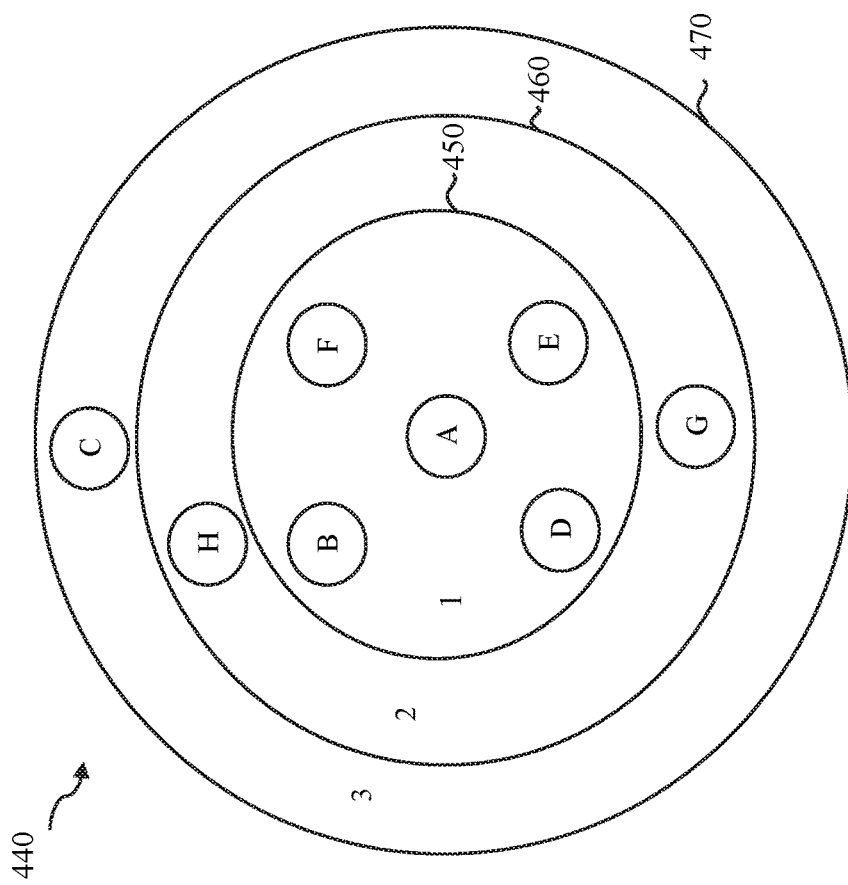
FIG. 4A is a circular ring diagram of an example of a search network including a first level network, a second level network and a third level network for a user input.

FIG. 4A is a diagram of an example of a search network including a first level network, a second level network and a third level network for a user input. The search network 400 may be created having different levels, for example, a first level search network 410, a second level search network 420 and a third level search network 430. The search network 400 may have more than three levels or less than three levels. The search network 400 may be created based on an identified intent, an identified context and an extracted entity from the user input. The levels of the repositories in the search network 400 may be determined based on the priority scores of the repositories. The levels of the repositories may also be determined based on user preferences.

For the user input "show me the latest sales reports," the search network 400 includes:
Repositories associated with user identifiers B, C, D and E in the first level search network 410.
Repositories associated with user identifiers G and F in the second level search network 420.
Repositories associated with user identifier H in the third level search network 430.

Figure 4B:
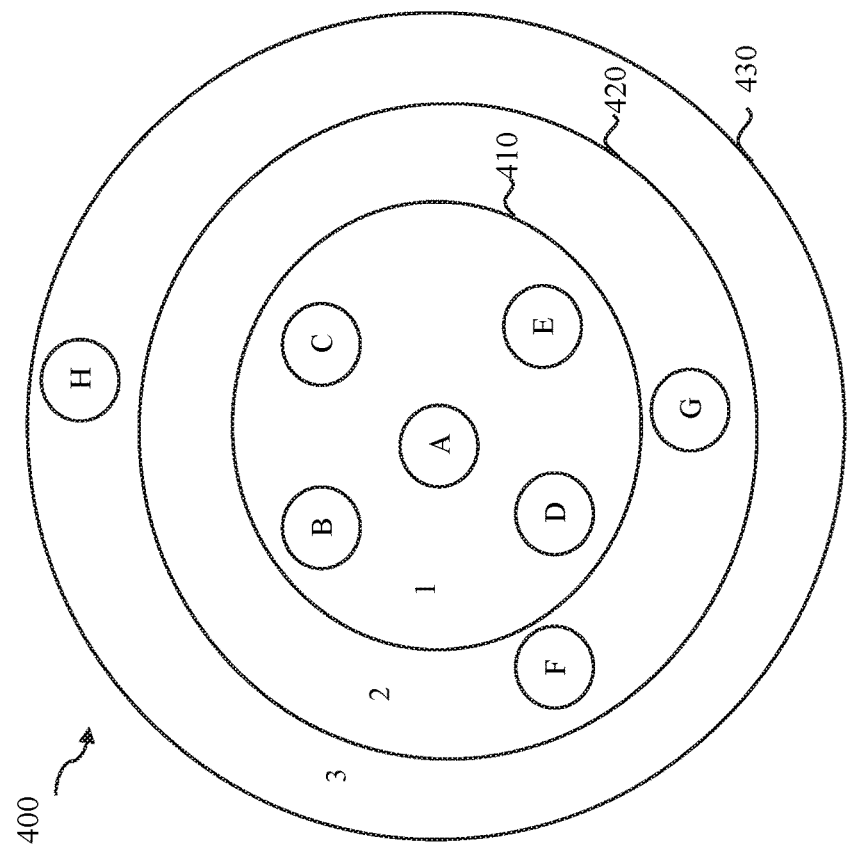
FIG. 4B is a circular ring diagram of an example of a modified version of the search network shown in FIG. 4A.

FIG. 4B is a diagram of an example of a modified search network. The search network 400 may be converted into a modified search network 440 based on the user input, a user feedback or learning by the predictive model. In one example, a subsequent user input includes: "The results were not relevant, include the sales network in the search network." Based on the user feedback, context, entities and intent in the subsequent user input, the search network building component 228 may create the modified search network 440. The modified search network 440 may be created based on user preferences. The modified search network 440 may also be manually created by the user using the VA interface 130(1) or any other graphical user interface presented to the user by one of the user devices 120(1)-120(n) using information transmitted by the VA server, for example VA server 100(1).

The modified search network 440 includes:
Repositories associated with user identifiers B, D, E and F in the first level search network 450.
Repositories associated with user identifiers G and H in the second level search network 460.
Repositories associated with user identifier C in the third level search network 470.

The search network building component 228 of FIG. 2 may interact with the second intelligence component 236 to adapt its output based on factors such as user input, the user feedback etc. The search network building component 228 of FIG. 2 may include software and may also include hardware configured to execute the software. The software or the hardware executing the software identify the group of repositories which may be included in the search network 400 or the modified search network 440.

The VA server 100(1) may choose to search any level of the search network to identify and output the results. The VA server 100(1) may search in the first level network and output the results to the user device. Upon receiving a negative feedback from the user operating the user device that the results are not relevant, the VA server 100(1) may search in the second level network and output the results to the user device. This process may continue until the VA server 100(1) exhausts searching the repositories in all the levels of the search network. The VA server 100(1) may prompt the user to suggest a repository to search or manually create the search network to search. The VA server 100(1) may also provide suggestions to help the user manually create the search network. The search network may be displayed to the user and the user may select or deselect repositories to be included in the search. The search network may also be co-created by the search network building component 228 of FIG. 2 and the user.

Figure 5A:
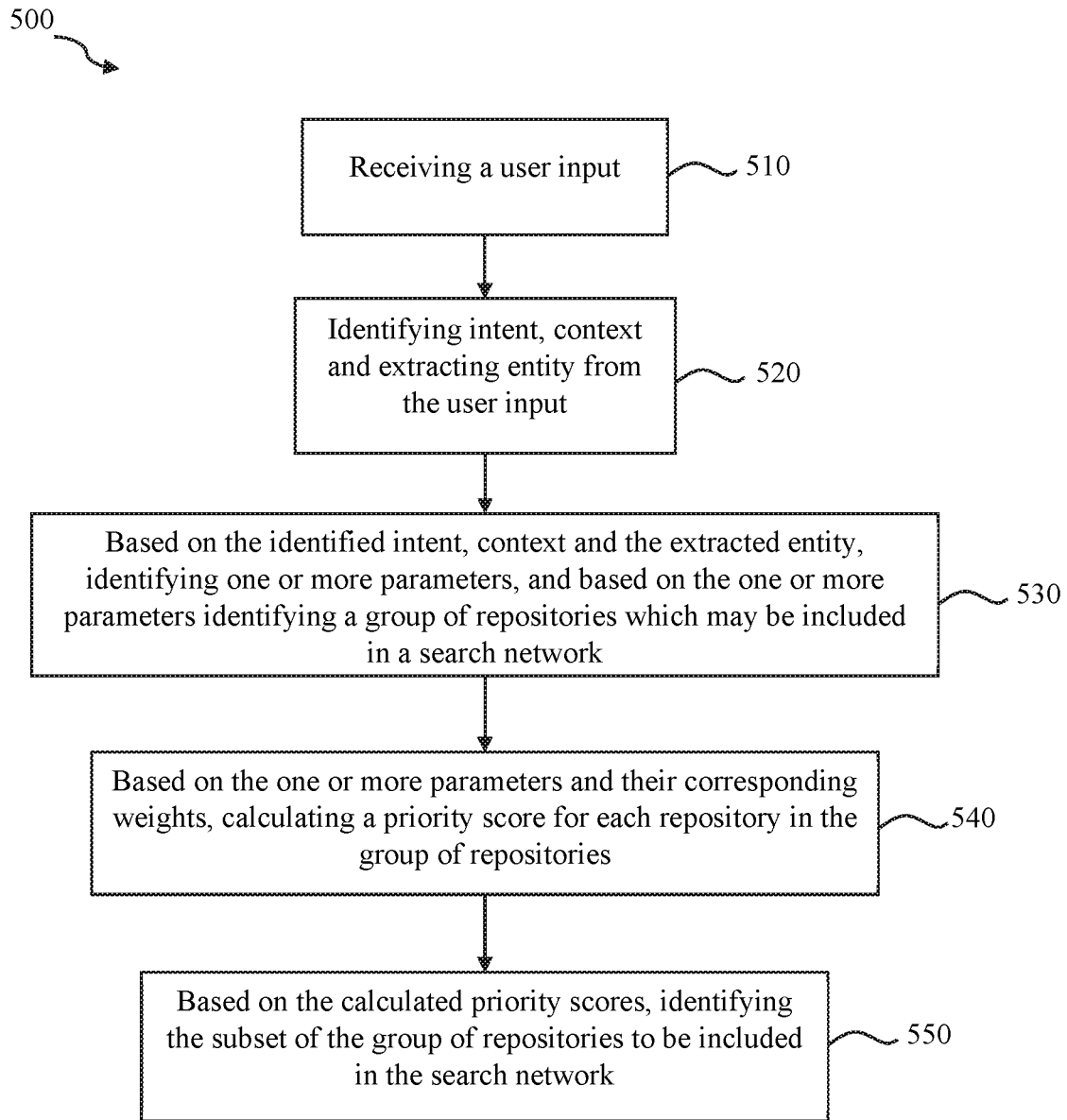
FIG. 5A is a flowchart of an example of a method for identifying repositories to include in a search network.

An exemplary method for identifying the repositories to be included in the search network will now be described with reference to FIG. 5A. The user A identified by a user identifier A, instructs the VA server 100(1): "show me the latest meeting notes on patents." At step 510, the VA server 100(1) receives a user input 510. At step 520, the user input is processed to identify intent, context and entity as:
  intent: show notes
  context: latest entity: meeting
topic extracted: patents At step 530, based on the identified intent, context and the extracted entity, one or more parameters are identified. Based on the identified one or more parameters, a group of repositories which may be included in a search network of user identifier A for the received user input are identified. The identified intent, context and the entity are input, in one example, into a rule-based engine or a predictive model to identify the one or more parameters. An example rule in the rule-based engine is mentioned below:

Rule 1:

IF intent has: <show notes> AND context has: <time element> AND entity has: <meeting> THEN include parameters <frequency of interactions><freshness of interactions><email subject><email content><meeting topic><meeting participants>. The rule-based engine may include synonyms to process the user input. For example, <time element> includes <now, recent, latest, current, fresh, up to date, short while ago, an hour back, timings in 24-hour format, timings in 12-hour format, days> etc. The one or more parameters may also be identified by the predictive model. The predictive model is trained using a set of data. When the user input is provided to the predictive model after the training, the predictive model outputs the one or more parameters and the weights associated with the one or more parameters for the user input.

Based on the identified one or more parameters, the VA server 100(1) considers the group of repositories associated with user identifiers B, C, D, E, F, G, H, I and J as probable candidates to be included in the search network. For example, the VA server 100(1) may include all the repositories which are associated with at least one of the identified one or more parameters as probable candidates to be included in the search network.

At step 540, the predictive model retrieves weights associated with the identified one or more parameter(s) for the repositories associated with user identifiers B, C, D, E, F, G, H, I and J. The weights associated with a set of the parameters, from which the one or more parameters are identified, are modified based on relevance after each user interaction. The weights are modified based on implicit or explicit user feedback, learning by the predictive model or other parameters. The weights associated with the identified one or more parameter(s) for the repositories associated with user identifiers B, C, D, E, F, G, H, I and J may also change based on the user identifier providing the user input. The weights of the parameters are used to calculate the priority score for each repository in the group of repositories.

At step 550, based on the calculated priority scores, the VA server 100(1) includes the repositories associated with user identifiers B, C, D, E, F, G, H in the search network. Repositories associated with user identifiers I and J are eliminated, as their priority score is less than a threshold. The threshold may be calculated, for example, as a percentage of the highest priority score, as an average, or median of the priority scores of the group of repositories. It may be understood that the threshold may be calculated by any suitable mathematical algorithm or formula. Further, it may be understood that any other logic may be used to consider the repositories to be included in the search network.

The VA server 100(1) calculates a priority score for each repository in the group of repositories and based on the calculated priority scores, identifies the repositories to be included in the search network.

In some examples, each repository identified to be included in the search network may be associated with at least one network user identifier that the user identifier interacted with. This interaction may include at least part of the user input. The user input associated with user identifier A includes "show me the latest lab reports." In one example, user identifier A chatted with user identifier B through the VA interface 130(1) on the topic lab reports. This is an example of an interaction and the repository associated with user identifier B may be included in the search network of user identifier A based on the user input. In another example, user identifier A previously instructed the VA server 100(1) to retrieve lab reports from repositories associated with user identifier C and user identifier D. This is an example of an interaction and the repositories associated with user identifiers C and D may be included in the search network based on the user input.

Figure 5B:
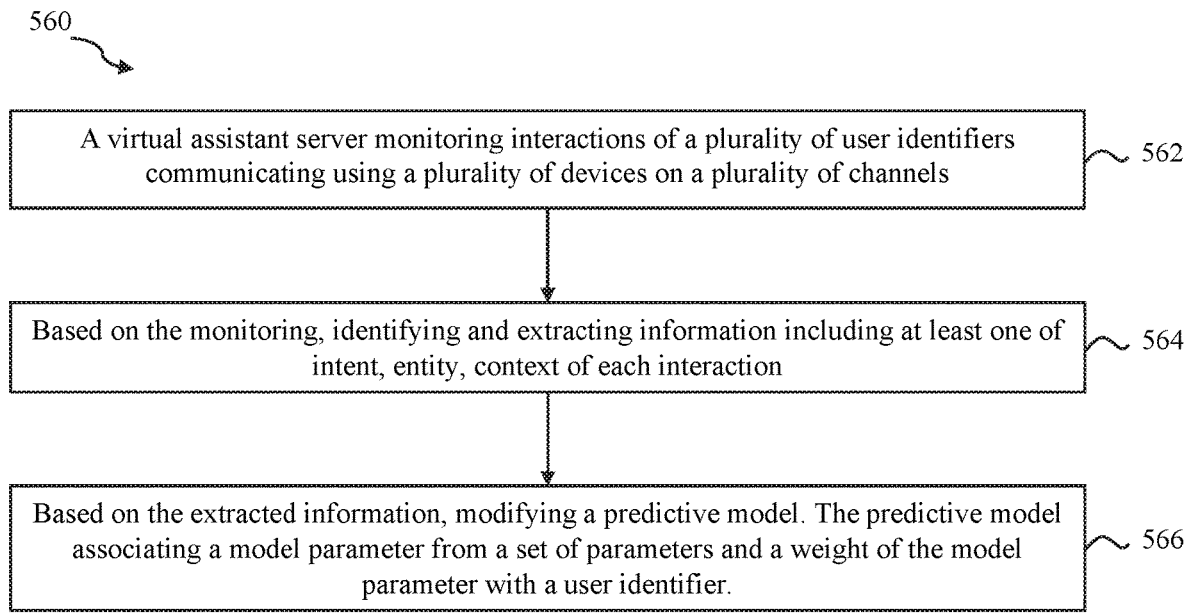
FIG. 5B is a flowchart of an example of a method for associating one or more parameters from a set of parameters and a weight to the one or more parameters with a user identifier.

FIG. 5B is a flowchart of an example of a method for associating one or more parameters from a set of parameters and a weight to the one or more parameters with a user. In one example, at step 562, the VA server 100(1) monitors interactions of a plurality of users communicating using a plurality of devices on a plurality of channels. At step 564, based on the monitored interaction information including at least one of intent, entity and context are extracted. It may be understood that information corresponding to other parameters such as <topic of interaction>, <date of interaction>, <time of interaction>, <duration of interaction>, <activity during interaction>, <participants in the interaction> and so on, may be extracted from the interactions. The extracted information is stored in the VA memory. At step 566, a predictive model is modified based on the extracted information. The predictive model associates one or more parameters from the set of parameters and a weight of the one or more parameters with a user identifier that identifies a user.

Figure 5C:
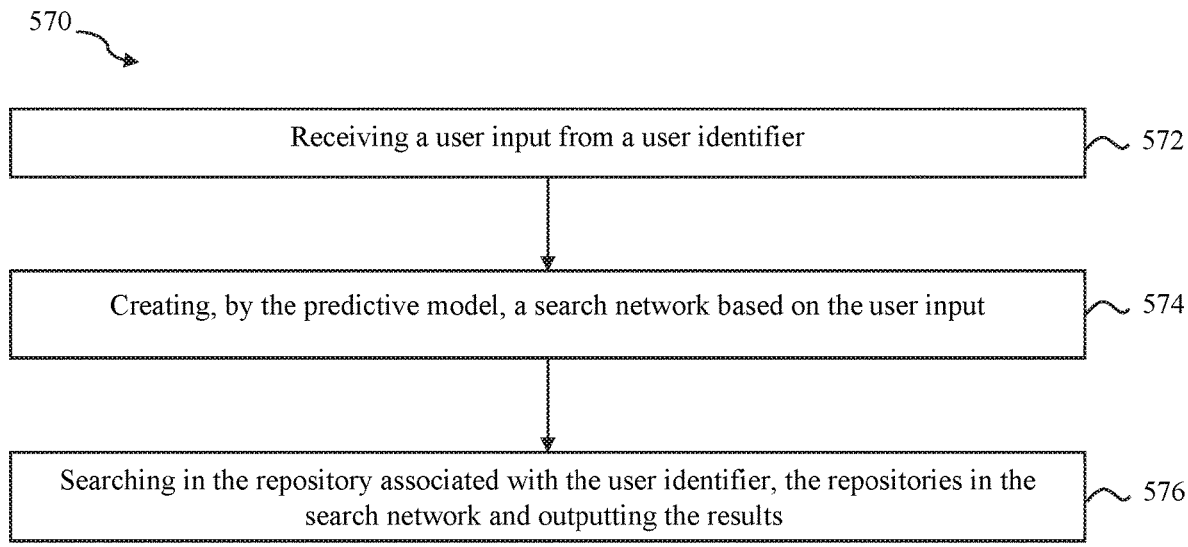
FIG. 5C is a flowchart of an example of a method for searching in the search network and outputting the results.

FIG. 5C is a flowchart of an example of a method for searching in the search network and outputting the results. At step 572, a user input is received from a user identifier associated with a user operating a user device and at step 574, the predictive model uses the user input and identifies one or more parameters. A search network of repositories is created using the one or more identified parameters. At step 576, a repository associated with the user identifier and the repositories in the search network are searched for the user input and the results are output to the user device. In one example, the VA server 100(1) may parse information from user interactions and dynamically modify the predictive model in real-time. The VA server 100(1) may also parse information from user interactions, store the information and periodically modify the predictive model. The VA server 100(1) may, based on the interactions of the users, modify weights of the set of parameters for many users in a synchronous or an asynchronous manner. The disclosed example improves system performance and user experience by providing a user interaction based and user input-based search network creation, search query creation and result identification.

Ranking

Figure 6:
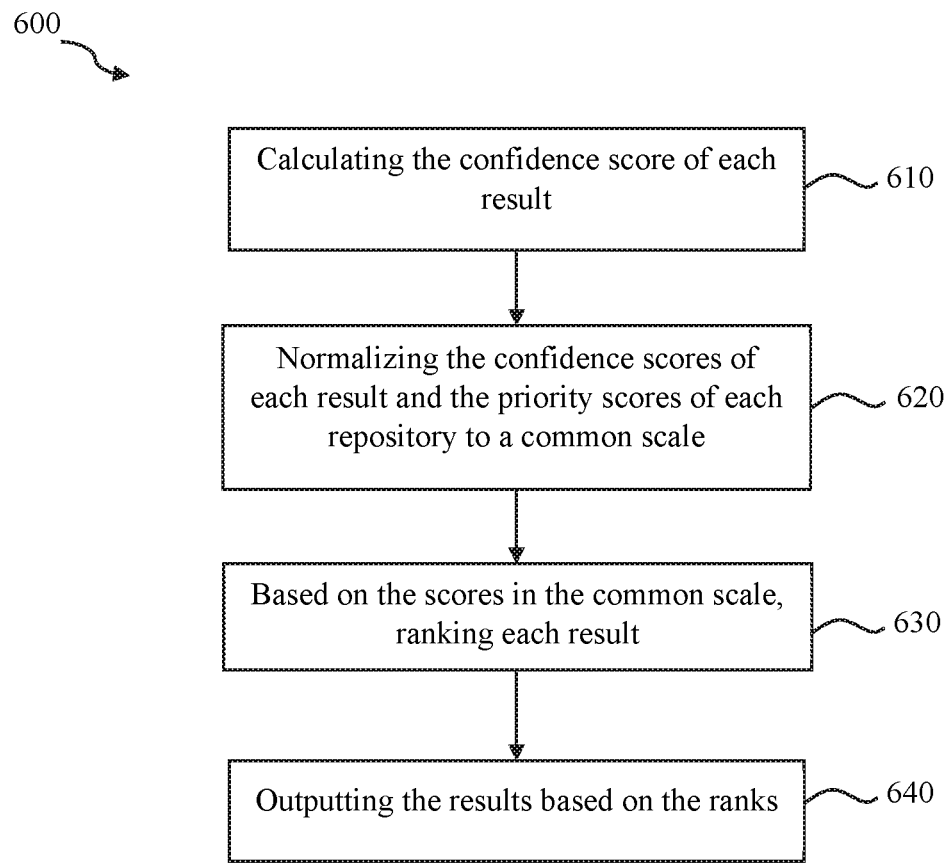
FIG. 6 is a flowchart of an example of a method for ranking the identified results.

FIG. 6 is a flowchart of an example of a method for ranking the identified results. The search query created in step 304 in FIG. 3A is used to search the repository associated with a user identifier and the repositories in the search network. At step 610, the VA server 100(1) calculates a confidence score of each identified result. Also, the VA server 100(1) calculates the priority score for each repository corresponding to the identified results. At step 620, the confidence score of each result and the priority score of each repository corresponding to the results are normalized to a common scale. At step 630, each identified result is ranked based on the scores in the common scale and at step 640 the identified results are output based on the ranks. The identified results may also be limited before outputting. For example, only top three results may be output to a device associated with the user identifier.

Several examples of the above described technologies eliminate the necessity to conduct a search in all the repositories in the network, thereby significantly improving the speed and accuracy of the search process. The VA server 100(1) identifies the repositories which are most likely to have the results and performs the search in those repositories. The VA server 100(1) may also use a predictive model which improves the accuracy by learning from training data, user interactions, user input and user feedback. By identifying and prioritizing the repositories, where the relevant information corresponding to the user input is most likely to be identified, based on user interactions and user input, the examples improve the relevancy, accuracy of the results and reduce the utilization of processor cycles, memory, power and network bandwidth necessary to retrieve the results.

The user identified by the user identifier may not have permission to view the results retrieved from the search network. In this case, the VA server 100(1) requests permission from the corresponding result user identifiers on behalf of the user identifier and provides access to the user identifier when the corresponding result user identifiers provides necessary permissions.

In one example, the data required by a user identifier A may be created by another user identifier B, C or D. Interactions of user identifier A and the input of user identifier A (user input) enables the VA server 100(1) to identify that the data required by user identifier A is already created by user identifier B, C or D. Creating a search network of repositories associated with users B, C and D based on user input and interactions of user A and searching in the search network is an efficient way to identify information and, in some cases, eliminates recreating the data.

In one example, the VA server 100(1) indexes the content of each repository in the network. Once the VA server 100(1) creates the search network to search in, the VA server 100(1) searches the indexes of each repository in the search network. In another example, the VA server 100(1) does not index the content of each repository in the search network. Once the VA server 100(1) creates the search network, the VA server 100(1) searches the content of each repository in the search network in real time. In both the examples, the VA server 100(1) creates the search network which includes the repositories which are most likely to have the results and performs the search in those repositories. This enables the VA server 100(1) to provide better results and retrieve the results faster in fewer clock cycles.

FIG. 7A is a wireframe of an example of an interaction in a web browser on a display of a computer with the virtual assistant server. A user identified by a user identifier uses the VA interface 130(1) to complete various tasks. The user may instruct the VA server 100(1) through the VA interface 130(1), for example, to: complete tasks, which can be performed by the VA server 100(1), assign or delegate tasks which can be performed by other user identifiers or devices. Hence, the VA server 100(1) acts as a virtual assistant to the user. The user may interact with the VA server 100(1) using the VA interface 130(1) executable on the user device. The VA interface 130(1) may be available on the user device as a pop-up on a website, integrated into a search bar, integrated into an address bar, as an application etc. After receiving a user input, the VA server 100(1) provides a response which is displayed in the VA interface 130(1). As illustrated in the figure, in one example, the response is provided in the form of text. The user may converse with the VA server 100(1) in natural language. An example conversation as illustrated is:

User: Show me the latest sales reports
VA server: I did not find any results in your repository. Do you want me to search in the network?
User: Yes
VA server: I found three reports in the network
User: Ok send the links of the reports as an email FIG. 7B is a wireframe of an example of an interaction on a display of a wearable device with the virtual assistant server. A user identified by a user identifier may interact with the VA server 100(1) using the VA interface 130(1) executable on the wearable device. An example conversation as illustrated is:

User: Show me the latest sales reports
VA server: I did not find any results in your repository. Do you want me to search in the network?

FIG. 7C is a wireframe of an example of an interaction on a display of a mobile device with the virtual assistant server. A user identified by a user identifier may interact with the VA server 100(1) using the VA interface 130(1) executable on the mobile device. An example conversation as illustrated is:

User: Show me the latest sales reports
VA server: I did not find any results in your repository. Do you want me to search in the network?
User: Yes
VA server: I found three reports in the network
User: Ok send them as an email The user may converse with the VA server 100(1) using, for example, text, voice, sound, eye movement, facial expressions, freehand input, gestures, a selection in a user interface or a combination of these. The response from the VA server 100(1) may be, for example, textual, visual, audible, or tactile. The user may provide the user input to the VA server 100(1) in natural language, for the VA server 100(1) to execute a task. In some examples, the user input may be an image, a document, a software code and so on. Example conversations with the VA server 100(1) using the VA interface 130(1) are described below.

Figure 7D:
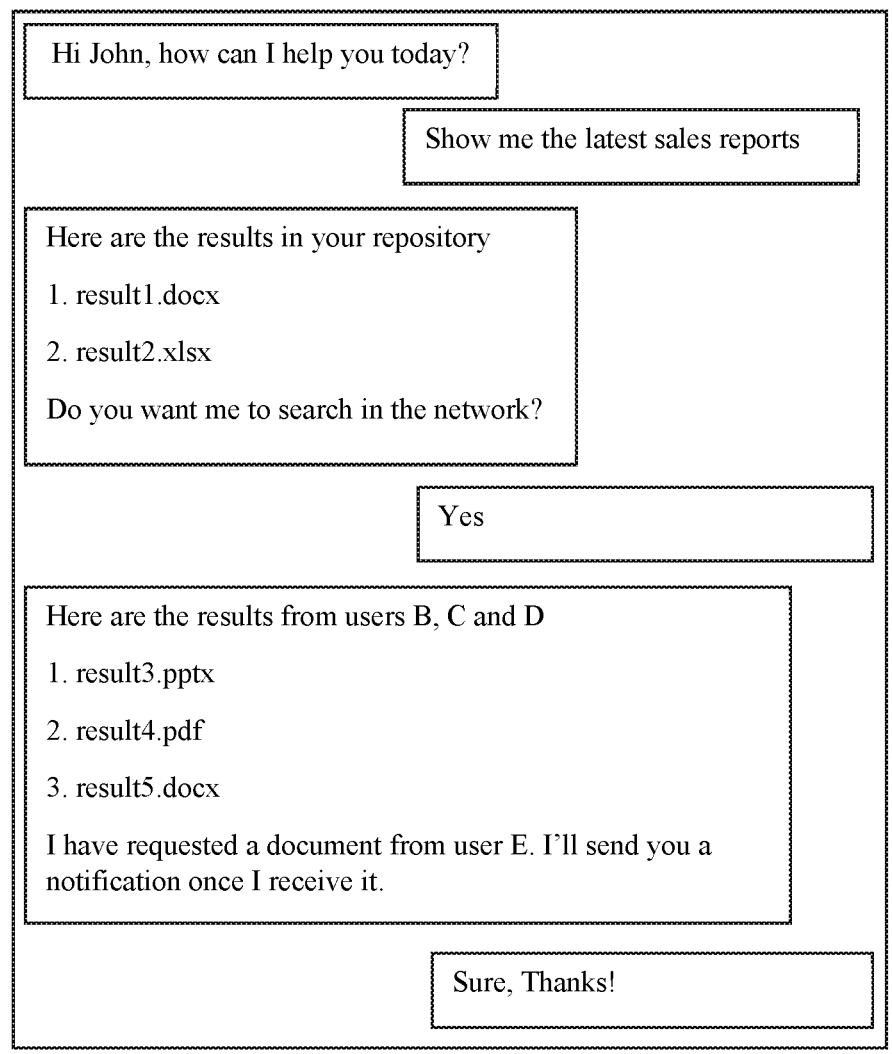
FIG. 7D is a wireframe of another example of an interaction on a display of a device with the virtual assistant server.

FIG. 7D is a wireframe of another example of an interaction on a display of a device with the virtual assistant server. As illustrated, a user identified by a user identifier instructs the VA server 100(1) to show the latest sales reports. Upon receiving the instruction, the VA server 100(1) processes the instruction from the user and outputs the results to the user device and the user device presents the results to the user. The results are identified by searching both the repository associated with the user identifier and the repositories not associated with the user device in the network. In one example, the VA server 100(1) initially outputs the results from the repository associated with the user identifier and upon an instruction from the user identifier, searches the repositories not associated with the user identifier to identify additional results.

Figure 7E:
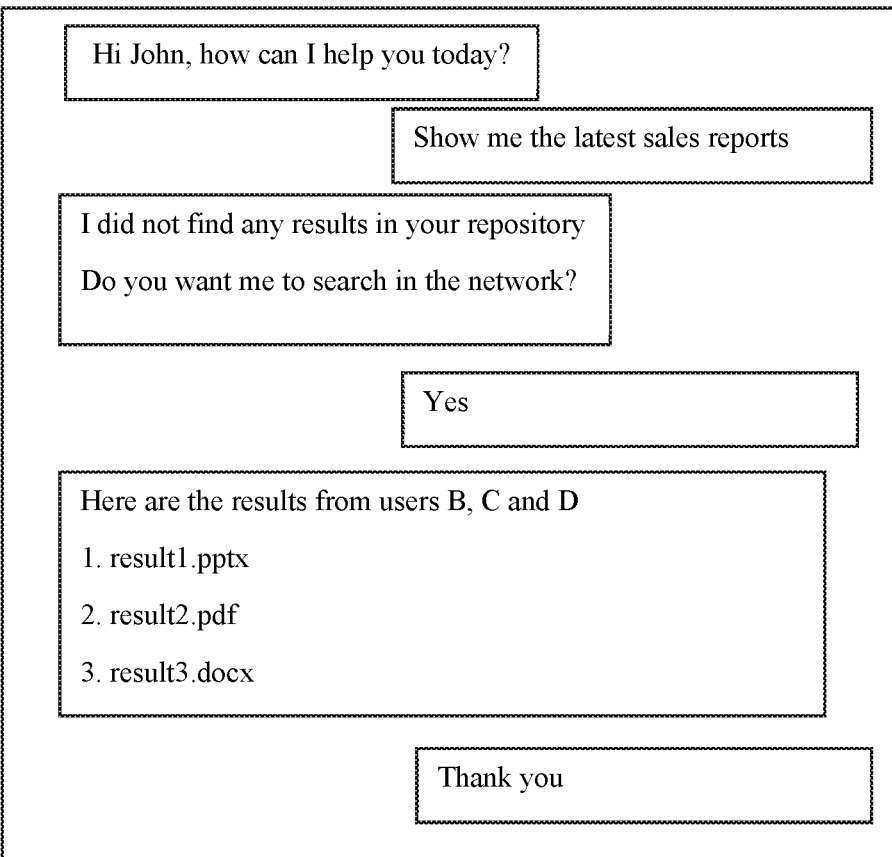
FIG. 7E is a wireframe of yet another example of an interaction on a display of a device with the virtual assistant server.

FIG. 7E is a wireframe of yet another example of an interaction on a display of a device with the virtual assistant server. As illustrated, a user identified by a user identifier instructs the VA server 100(1) to show the latest sales reports. Upon receiving the instruction, the VA server 100(1) processes the instruction from the user identifier and does not identify any results from the repository associated with the user identifier. Subsequently, the VA server 100(1) requests an instruction from the user identifier to search the repositories not associated with the user identifier. Upon receiving a confirmation, the VA server 100(1) searches the repositories not associated with the user identifier and outputs the results to the user device. The user device presents the results to the user.

Figure 7F:
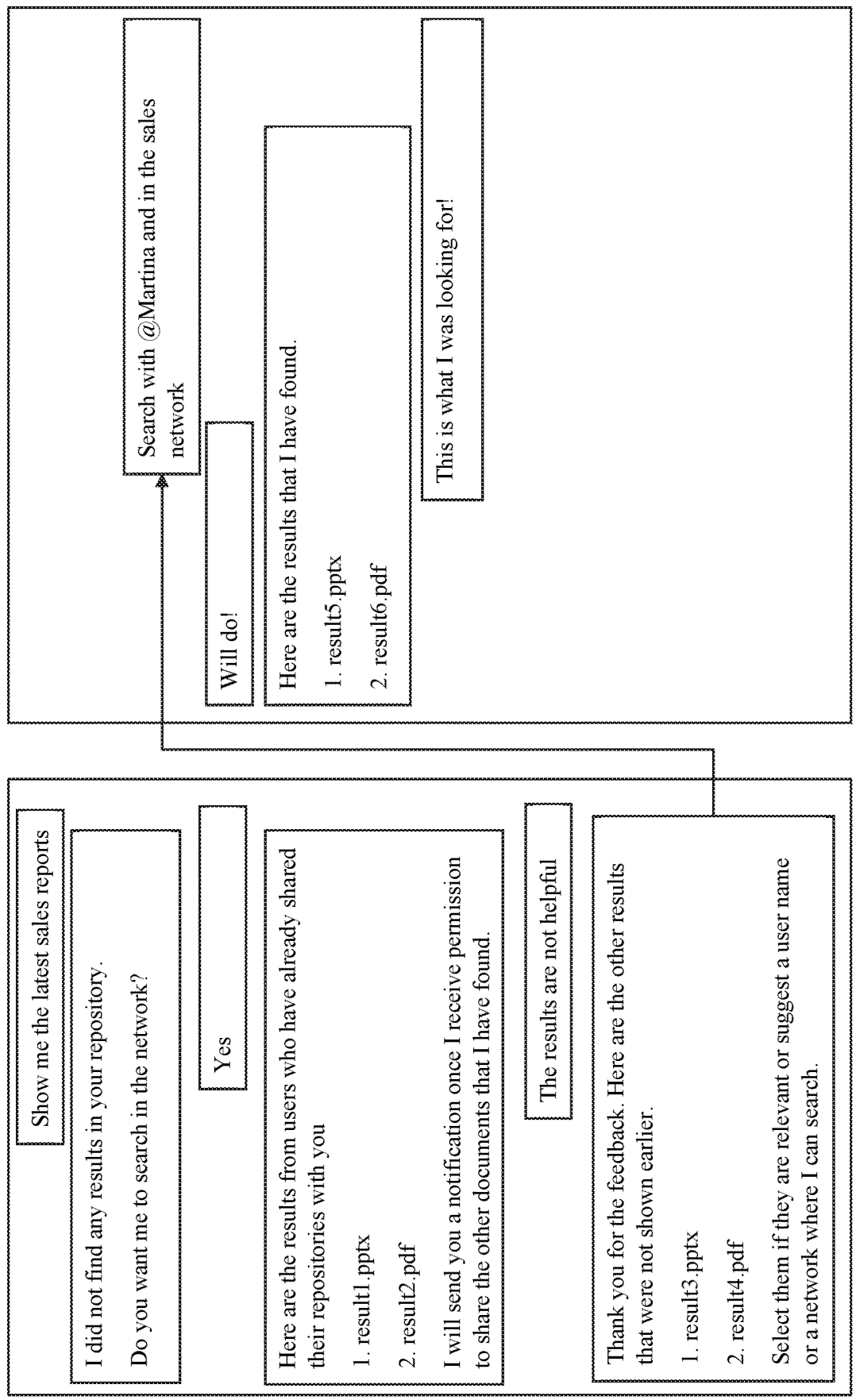
FIG. 7F is a wireframe of a further another example of an interaction on a display of a device with the virtual assistant server.

FIG. 7F is a wireframe of a further another example of an interaction on a display of a device with the virtual assistant server. As illustrated, a user identified by a user identifier instructs the VA server 100(1) to show the latest sales reports. Upon receiving the instruction, the VA server 100(1) processes the instruction from the user identifier and does not identify any results in the repository associated with the user identifier. Subsequently, the VA server 100(1) requests an instruction from the user to search the repositories not associated with the user identifier. Upon receiving a confirmation, the VA server 100(1) searches the repositories not associated with the user identifier. The VA server 100(1) initially outputs results from repositories which are not associated with the user identifier and which are already shared with the user identifier. Upon receiving a feedback from the user identifier that the results are not relevant, the VA server 100(1) outputs other results that the VA server 100(1) has found and requests an instruction from the user identifier to either select one of the presented results or suggest a source(s) to repeat the search. Subsequently, upon receiving the user instruction about the source(s) to search, the VA server 100(1) searches the source(s) mentioned by the user identifier and outputs the results.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
searching, by a computing device, one or more of a plurality of repositories that are associated with a user identifier to identify at least one first result that corresponds to a received user input from a virtual assistant interface on a client system associated with the user identifier;
selecting, by the computing device, based on the user input, one or more of a remaining subset of the plurality of repositories unassociated with the user identifier;
determining, by the computing device, priority scores for each of the selected one or more of the remaining subset of the plurality of repositories based on interactions performed via the virtual assistant interface;
creating, by the computing device, a search network comprising one or more of the selected one or more of the remaining subset of the plurality of repositories in multiple levels based on the determined priority scores;
identifying, by the computing device from the search network, one or more additional results that correspond to the received user input;
identifying, by the computing device, at least one non-eliminated result from the one or more additional results based on comparing a scoring parameter of each of the one or more additional results with a threshold;
ranking, by the computing device, the at least one first result and the at least one non-eliminated result based on comparing the scoring parameter associated with the at least one first result and the at least one non-eliminated result; and
outputting, by the computing device, based on the ranking, the at least one first result and the at least one non-eliminated result.

2. The method of claim 1, wherein the scoring parameter comprises a confidence score or the determined priority score.

3. The method of claim 1, wherein the priority score is determined using one or more parameters of the interactions comprising: a meeting topic, meeting notes, usernames or email addresses of meeting participants, interaction time, percentage of interaction, tasks created by the user identifier for the meeting participants or knowledge shared by the user identifier through the virtual assistant interface.

4. The method of claim 1, further comprising:
determining, by the computing device, when a sharing permission required to share the at least one non-eliminated result with the user identifier is absent; and
requesting and receiving, by the computing device, the sharing permission of the at least one non-eliminated result when the determination indicates the absence of the required sharing permission.

5. The method of claim 1, further comprising creating, by the computing device, a copy of the at least one non-eliminated result.

6. The method of claim 5, further comprising creating, by the computing device, access control applicable to the copy of the at least one non-eliminated result.

7. The method of claim 1, wherein the at least one first result or the at least one non-eliminated result comprise: a document, a part of a document, an e-mail, a part of an e-mail, a contact, a multimedia file, a HTML file, a credential, a software program, a part of a software program, an image, an editable interface or a workflow.

8. A system comprising:
a processor; and
a memory coupled to the processor which is configured to be capable of executing programmed instructions comprising and stored in the memory to:
search one or more of a plurality of repositories that are associated with a user identifier to identify at least one first result that corresponds to a received user input from a virtual assistant interface on a client system associated with the user identifier;
select, based on the user input, one or more of remaining subset of the plurality of repositories unassociated with the user identifier;
determine priority scores for each of the selected one or more of the remaining subset of the plurality of repositories based on interactions performed via the virtual assistant interface;
create a search network comprising one or more of the selected one or more of the remaining subset of the plurality of repositories in multiple levels based on the determined priority scores;
identify from the search network one or more additional results that correspond to the received user input;
identify at least one non-eliminated result from the one or more additional results based on comparing a scoring parameter of each of the one or more additional results with a threshold;

rank the at least one first result and the at least one non-eliminated result based on comparing the scoring parameter associated with the at least one first result and the at least one non-eliminated result; and output, based on the ranking, the at least one first result and the at least one non-eliminated result.

9. The system of claim 8, wherein the scoring parameter comprises a confidence score or the determined priority score.

10. The system of claim 8, wherein the priority score is determined using one or more parameters of the interactions comprising: a meeting topic, meeting notes, usernames or email addresses of meeting participants, interaction time, percentage of interaction, tasks created by the user identifier for the meeting participants or knowledge shared by the user identifier through the virtual assistant interface.

11. The system of claim 8, wherein the processor is further configured to be capable of executing programmed instructions comprising and stored in the memory to:

determine when a sharing permission required to share the at least one non-eliminated result with the user identifier is absent; and request and receive the sharing permission of the at least one non-eliminated result when the determination indicates the absence of the required sharing permission.

12. The system of claim 8, wherein the processor is further configured to be capable of executing programmed instructions comprising and stored in the memory to:

create a copy of the at least one non-eliminated result.

13. The system of claim 12, wherein the processor is further configured to be capable of executing programmed instructions comprising and stored in the memory to:

create access control applicable to the copy of the at least one non-eliminated result.

14. The system of claim 8, wherein the at least one first result or the at least one non-eliminated result comprise: a document, a part of a document, an e-mail, a part of an e-mail, a contact, a multimedia file, a HTML file, a credential, a software program, a part of a software program, an image, an editable interface or a workflow.

15. A non-transitory computer readable medium having stored thereon instructions comprising executable code which when executed by a processor, causes the processor to perform steps comprising:

searching one or more of a plurality of repositories that are associated with a user identifier to identify at least one first result that corresponds to a received user input from a virtual assistant interface on a client system associated with the user identifier;

selecting, based on the user input, one or more of remaining subset of the plurality of repositories unassociated with the user identifier;

determining priority scores for each of the selected one or more of the remaining subset of the plurality of repositories based on interactions performed via the virtual assistant interface;

creating a search network comprising one or more of the selected one or more of the remaining subset of the plurality of repositories in multiple levels based on the determined priority scores;

identifying from the search network one or more additional results that correspond to the received user input;

identifying at least one non-eliminated result from the one or more additional results based on comparing a scoring parameter of each of the one or more additional results with a threshold;

ranking the at least one first result and the at least one non-eliminated result based on comparing the scoring parameter associated with the at least one first result and the at least one non-eliminated result; and outputting, based on the ranking, the at least one first result and the at least one non-eliminated result.

16. The non-transitory computer-readable storage medium of claim 15, wherein the scoring parameter comprises a confidence score or the determined priority score.

17. The non-transitory computer-readable storage medium of claim 15, wherein the priority score is determined using one or more parameters of the interactions comprising: a meeting topic, meeting notes, usernames or email addresses of meeting participants, interaction time, percentage of interaction, tasks created by the user identifier for the meeting participants or knowledge shared by the user identifier through the virtual assistant interface.

18. The non-transitory computer-readable storage medium of claim 15, further comprising:

determining when a sharing permission required to share the at least one non-eliminated result with the user identifier is absent; and requesting and receiving the sharing permission of the at least one non-eliminated result when the determination indicates the absence of the required sharing permission.

19. The non-transitory computer-readable storage medium of claim 15, further comprising:

creating a copy of the at least one non-eliminated result.

20. The non-transitory computer-readable storage medium of claim 19, further comprising creating access control applicable to the copy of the at least one non-eliminated result.

21. The non-transitory computer-readable storage medium of claim 15, wherein the at least one first result or the at least one non-eliminated result comprise: a document, a part of a document, an e-mail, a part of an e-mail, a contact, a multimedia file, a HTML, file, a credential, a software program, a part of a software program, an image, an editable interface or a workflow.

* * * * *